US011228507B2

(12) United States Patent
Clarke et al.

(10) Patent No.: US 11,228,507 B2
(45) Date of Patent: Jan. 18, 2022

(54) BASELINING SERVICE-TAGGED DATA FROM SUBSERVICES OF A SERVICE FOR SERVICE ASSURANCE

(71) Applicant: Cisco Technology, Inc., San Jose, CA (US)

(72) Inventors: Joseph M. Clarke, Cary, NC (US); Benoit Claise, Othée (BE); Eric Vyncke, Alleur (BE); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/704,163

(22) Filed: Dec. 5, 2019

(65) Prior Publication Data

US 2021/0176142 A1    Jun. 10, 2021

(51) Int. Cl.
  *H04L 12/24* (2006.01)
  *H04L 12/26* (2006.01)
  *H04L 29/08* (2006.01)

(52) U.S. Cl.
  CPC ...... *H04L 41/5025* (2013.01); *H04L 41/5032* (2013.01); *H04L 41/5048* (2013.01);
  (Continued)

(58) Field of Classification Search
  CPC ............. H04L 41/5025; H04L 41/5032; H04L 41/5048; H04L 41/5054; H04L 43/0817; H04L 67/16; H04L 67/36
  (Continued)

(56) References Cited

U.S. PATENT DOCUMENTS 9,014,013 B2  4/2015  Durrani et al.
9,059,941 B1  6/2015  Oweis et al.
(Continued)

FOREIGN PATENT DOCUMENTS

EP    1206085 A1    5/2002
EP    3467644 A1    4/2019
(Continued)

OTHER PUBLICATIONS

Cisco, "Intent-Based Networking", White paper Cisco public, Jan. 2018, 11 pages.
(Continued)

*Primary Examiner* — David P Zarka
(74) *Attorney, Agent, or Firm* — Edell, Shapiro & Finnan, LLC

(57) ABSTRACT

A method comprises configuring a service as a collection of subservices on network devices of a network, and decomposing a definition of the service into a subservice dependency graph that indicates the subservices and dependencies between the subservices that implement the service. The method further comprises, based on the subservice dependency graph, configuring a subservice among the subservices to record and report a subservice metric as an indicator of subservice performance. The method further comprises determining a rate at which to obtain values of the subservice metric from the subservice, determining a confidence interval for the values of the subservice metric, and obtaining the values of the subservice metric from the subservice at the rate, to produce values for monitoring the subservice. The method also includes determining whether at least one of the values for monitoring the subservice is within the confidence interval.

20 Claims, 33 Drawing Sheets

(52) U.S. Cl.
CPC ...... *H04L 41/5054* (2013.01); *H04L 43/0817* (2013.01); *H04L 67/16* (2013.01); *H04L 67/36* (2013.01)

(58) Field of Classification Search
USPC ........................................................ 709/224
See application file for complete search history.

(56) References Cited

U.S. PATENT DOCUMENTS

| | | | |
|---|---|---|---|
| 9,304,815 B1 | 4/2016 | Vasanth et al. | |
| 9,565,092 B2* | 2/2017 | Vecera | G06F 9/5083 |
| 9,660,929 B1 | 5/2017 | Herzog | |
| 9,774,541 B1 | 9/2017 | Herzog et al. | |
| 9,825,865 B1 | 11/2017 | Sharma et al. | |
| 9,929,923 B2 | 3/2018 | Heinz et al. | |
| 9,992,082 B2 | 6/2018 | Macneil et al. | |
| 10,158,556 B2 | 12/2018 | Iqbal et al. | |
| 10,277,461 B1 | 4/2019 | A et al. | |
| 10,372,520 B2 | 8/2019 | Johnston et al. | |
| 10,467,087 B2* | 11/2019 | Zarrini | G06F 11/079 |
| 10,503,613 B1* | 12/2019 | Moses | H04L 67/2861 |
| 10,630,539 B2* | 4/2020 | Tubillara | H04L 41/5025 |
| 10,637,744 B2 | 4/2020 | Carroll et al. | |
| 10,650,048 B2* | 5/2020 | Li | G06F 16/245 |
| 10,778,754 B2* | 9/2020 | Capello | H04L 67/1008 |
| 2005/0181835 A1 | 8/2005 | Lau et al. | |
| 2009/0094078 A1* | 4/2009 | Kaehne | G06Q 99/00 705/7.35 |
| 2011/0261049 A1 | 10/2011 | Cardno | |
| 2012/0106322 A1 | 5/2012 | Gero et al. | |
| 2012/0209948 A1 | 8/2012 | Tenenblat et al. | |
| 2012/0215912 A1 | 8/2012 | Houlihan et al. | |
| 2014/0219105 A1 | 8/2014 | Sathappan et al. | |
| 2015/0100371 A1* | 4/2015 | Leader | G06Q 30/0201 705/7.29 |
| 2015/0134788 A1 | 5/2015 | Kalyana et al. | |
| 2015/0143355 A1* | 5/2015 | Tingstrom | G06F 8/65 717/170 |
| 2016/0026675 A1* | 1/2016 | Liu | G06F 16/2365 707/690 |
| 2016/0042014 A1 | 2/2016 | Jalan et al. | |
| 2016/0043944 A1 | 2/2016 | Felstaine et al. | |
| 2016/0127201 A1 | 5/2016 | Qian et al. | |
| 2016/0142251 A1 | 5/2016 | Contreras et al. | |
| 2016/0182320 A1 | 6/2016 | Bartfai-Walcott et al. | |
| 2016/0359878 A1 | 12/2016 | Prasad et al. | |
| 2017/0063599 A1 | 3/2017 | Wu et al. | |
| 2017/0078176 A1 | 3/2017 | Lakshmikantha et al. | |
| 2017/0149637 A1 | 5/2017 | Banikazemi et al. | |
| 2017/0289060 A1 | 10/2017 | Aftab et al. | |
| 2017/0324768 A1 | 11/2017 | Crabtree et al. | |
| 2018/0152359 A1 | 5/2018 | Qian et al. | |
| 2018/0309632 A1 | 10/2018 | Kompella et al. | |
| 2019/0028909 A1 | 1/2019 | Mermoud et al. | |
| 2019/0081869 A1 | 3/2019 | Wu et al. | |
| 2019/0098071 A1 | 3/2019 | Bitincka et al. | |
| 2019/0104019 A1 | 4/2019 | Makovsky et al. | |
| 2019/0124555 A1 | 4/2019 | Szilagyi et al. | |
| 2019/0132213 A1 | 5/2019 | Na et al. | |
| 2019/0253328 A1 | 8/2019 | Kolar et al. | |
| 2019/0363979 A1 | 11/2019 | Cui et al. | |
| 2019/0394283 A1* | 12/2019 | Morrison | G06F 7/50 |
| 2020/0042426 A1* | 2/2020 | Ambichl | G06F 11/3006 |
| 2020/0045116 A1* | 2/2020 | Deodhar | G06F 9/5077 |
| 2020/0050444 A1* | 2/2020 | Nikam | G06F 8/65 |
| 2020/0133701 A1* | 4/2020 | Agrawal | G06F 9/485 |
| 2020/0169494 A1 | 5/2020 | K et al. | |
| 2021/0105189 A1* | 4/2021 | Claise | H04L 41/5009 |

FOREIGN PATENT DOCUMENTS

| | | |
|---|---|---|
| WO | 2016119620 A1 | 8/2016 |
| WO | 2017129248 A1 | 8/2017 |

OTHER PUBLICATIONS

Path Solutions, "Root—Cause Troubleshooting for Your Entire Network", Path Solutions Inc., 2019, 2 pages.
VMWare, "VMWare Smart Assurance", VMWare, Inc., Palo Alto, CA, 2019, 4 pages.
IQBAL, Faisal et al., "Data Plane Monitoring in Segment Routing Networks", downloaded Sep. 30, 2019, 18 pages.
R. Geib, Ed. et al., "A Scalable and Topology-Aware MPLS Data-Plane Monitoring System", Internet Engineering Task Force (IETF), Request for Comments: 8403, Jul. 2018, 19 pages.
R. Geib, Ed. et al., "A Scalable and Topology-Aware MPLS Dataplane Monitoring System", draft-ietf-spring-oam-usecase-09, Jul. 25, 2017, 13 pages.
International Search Report and Written Opinion for International Application No. PCT/US2020/052645, dated Dec. 11, 2020, 15 pages.
International Search Report and Written Opinion in counterpart International Application No. PCT/US2020/062137, dated Mar. 5, 2021, 14 pages.

* cited by examiner

302 — At path rpc-reply/data/devices/device[sain-pe-1]/config/interface/GigabitEthernet:
<GigabitEthernet xmlns="http://tail-f.com/ned/cisco-ios-xr"
304 — xmlns:nc="urn:ietf:params:xml:ns:netconf:base:1.0" refcounter="2" backpointer="[
/ncs:services/l2vpn:l2vpn-p2p[l2vpn:vpn-id='xyz']]">
306 — <id>0/0/0/3</id>
<description>to sain-ce-1</description>
308 — <mtu refcounter="1">4010</mtu>
310 {
<ipv4>
 <address>
  <ip>192.0.2.3</ip>
  <mask>255.255.255.252</mask>
 </address>
</ipv4>
312 {
<ipv6>
 <address>
  <prefix-list>
   <prefix>2001:db8::1:1:0:b</prefix>
  </prefix-list>
 </address>
</ipv6>
<cdp/>
</GigabitEthernet>

502 {
At path rpc-reply/data/devices/device[sain-pe-2]/config/l2vpn:
<l2vpn xmlns="http://tail-f.com/ned/cisco-ios-xr"
xmlns:nc="urn:ietf:params:xml:ns:netconf:base:1.0" refcounter="1" backpointer="[
/ncs:services/l2vpn:l2vpn-p2p[l2vpn:vpn-id='xyz'] ]">

504 {
  <xconnect>
   <group refcounter="1" backpointer="[ /ncs:services/l2vpn:l2vpn-p2p[l2vpn:vpn-id='xyz'] ]">
    <name>l2vpn</name>
    <p2p refcounter="1" backpointer="[ /ncs:services/l2vpn:l2vpn-p2p[l2vpn:vpn-id='xyz'] ]">
     <name>P2P_xyz</name>
     <interface refcounter="1" backpointer="[ /ncs:services/l2vpn:l2vpn-p2p[l2vpn:vpn-id='xyz'] ]">
      <name>GigabitEthernet0/0/0/2.600</name> — 506
     </interface>
     <neighbor refcounter="1" backpointer="[ /ncs:services/l2vpn:l2vpn-p2p[l2vpn:vpn-id='xyz'] ]">
      <address>192.0.2.17</address> — 508
      <pw-id>11000</pw-id>
      <ip-version refcounter="1">ipv4</ip-version>
      <pw-class refcounter="1">SAIN_PW_CLASS</pw-class>
     </neighbor>
    </p2p>
   </group>
  </xconnect>
</l2vpn>

902 — ISISHealthy
Check whether IS-IS is healthy from a global point of view

904 — Arguments
- device: Device where the global IS-IS health for one area is checked
- display level = routing
- web_label = IS-IS global heath computed on {device}

Expressions

906 — Measure
- isis_ipv4_routes: List valid IPv4 IS-IS routes
  - device = device
- isis_ipv6_routes: List valid IPv6 IS-IS routes
  - device = device 908 — Compute
- ipv4_routes_count: number of elements/routes in 'isis_ipv4_routes'
  - Len(isis_ipv4_routes)
- ipv6_routes_count: number of elements/routes in 'isis_ipv6_routes'
  - Len(isis_ipv6_routes)
- average_ipv4_isis-routes_count: trailing average of IPv4 IS-IS routes
  - Mean(ipv4_routes_count, 20)
- average_ipv6_isis-routes_count: trailing average of IPv6 IS-IS routes
  - Mean(ipv6_routes_count, 20)
- ipv4_isis_routes_stability: IPv4 IS-IS routes baselining
  degraded if false: IPv4 routes unstable
  - Baseline(average_ipv4_isis_routes_count, 120)
- ipv6_isis_routes_stability: IPv6 IS-IS routes baselining
  degraded if false: IPv6 routes unstable
  - Baseline(average_ipv6_isis_routes_count, 120)

910 — - ISISHealthy: status of the subservice
  - Combine(ipv4_isis_routes_stability, ipv6_isis_routes_stability)

☐ Main page
☐ Symptoms
☐ Top 10 issues l2vpn-p2p services status

| Selected | Name | | Status |
|---|---|---|---|
| ☐ | l2vpn-p2p | Customer A | Degraded (0.5) |
| ☐ | l2vpn-p2p | Customer B | Degraded (0.5) |

⎱ 1102 agents-health services status

| Selected | Name | Status |
|---|---|---|
| ☐ | agents-health instance | Healthy (1.0) |

⎱ 1104 sain-tunnel services status

| Selected | Name | | Status |
|---|---|---|---|
| ☐ | sain-tunnel | Customer C | Degraded (0.5) |
| ☐ | sain-tunnel | Customer D | Degraded (0.5) |

⎱ 1106 sain-tunnel-ipv6 services status

| Selected | Name | | Status |
|---|---|---|---|
| ☐ | sain-tunnel-ipv6 | Customer E | Degraded (0.5) |

⎱ 1108 custom_service services status

| Selected | Name | Status |
|---|---|---|
| ☐ | custom_service instance | Degraded (0.5) |

BASELINING SERVICE-TAGGED DATA FROM SUBSERVICES OF A SERVICE FOR SERVICE ASSURANCE

TECHNICAL FIELD

The present disclosure relates to assurance of services enabled on networks.

BACKGROUND

A compulsory step for intent-based networking involves closing a loop with telemetry for service assurance. Discovering whether a service fulfills its service level agreement (SLA) is relatively easy when monitoring synthetic traffic mimicking the service. However, such an over-the-top mechanism only provides SLA compliance results that considers a network on which the service is enabled as a "black box," without knowledge of inner workings or low-level components of the service. Therefore, a network operator tasked with the monitoring of the service has limited or no insights on which specific degraded or faulty network components/features are responsible for service degradation. This issue is particularly difficult when the network is composed of heterogeneous network components. Telemetry exists today to report operational information, but an issue arises in that telemetry from network devices in the network does not provide service context information. Hence, troubleshooting the service based on the telemetry is very complex, with, on one side, the service information, and on another side, network device-specific telemetry information. In the event that the network operator discovers that a service is underperforming, e.g., is not fulfilling its SLA, it may be near impossible for the network operator to identify in an efficient manner which low-level components of the service are responsible for such underperformance. The inability to identify efficiently the problematic low-level components hampers efforts to make repairs at the component-level in order to restore acceptable performance to the service.

As alluded to above, conventional service monitoring of a service involves monitoring various low-level operational network parameters related to the service. The monitoring compares the low-level operational network parameters to static thresholds, initially established when the service is instantiated, without associating results of the comparison (i.e., comparison results) to actual, high-level service performance. Thus, a question arises as to whether the comparison results are meaningful or useful at the service-level. Moreover, because service operation is highly dynamic over a lifetime of the service, the static thresholds often result in comparison results that incorrectly imply either acceptable or unacceptable service-level performance, as time progresses.

BRIEF DESCRIPTION OF THE DRAWINGS

FIG. 3 is an illustration of service configuration information for a first network device and an interface on the first network device for a specific service, according to an example embodiment.

FIG. 5 is an illustration of service configuration information for a first cross-connect (xconnect) associated with the second network device for the specific service, according to an example embodiment.

FIG. 9 is an illustration of a heuristic package for a network protocol implemented on a network device used for the service, according to an example embodiment.

FIG. 11 is an illustration of UI generated for display by the assurance collectors based on an analysis of service-tagged subservice metrics for multiple services, according to an example embodiment.

DESCRIPTION OF EXAMPLE EMBODIMENTS

Overview

A method is performed at one or more entities that configure, and provide assurance for, services enabled on a network. A service is configured as a collection of subservices on network devices of a network. A definition of the service is decomposed into a subservice dependency graph that indicates the subservices and dependencies between the subservices that implement the service. Based on the subservice dependency graph, a subservice among the subservices is configured to record and report a subservice metric as an indicator of subservice performance. A rate at which to obtain values of the subservice metric from the subservice is determined. A confidence interval for the values of the subservice metric is determined. Values of the subservice metric are obtained from the subservice at the rate, to produce values for monitoring the subservice. It is determined whether at least one of the values for monitoring the subservice is within the confidence interval.

EXAMPLE EMBODIMENTS

Service Assurance for Intent-Based Networking (SAIN)

Figure 1A:
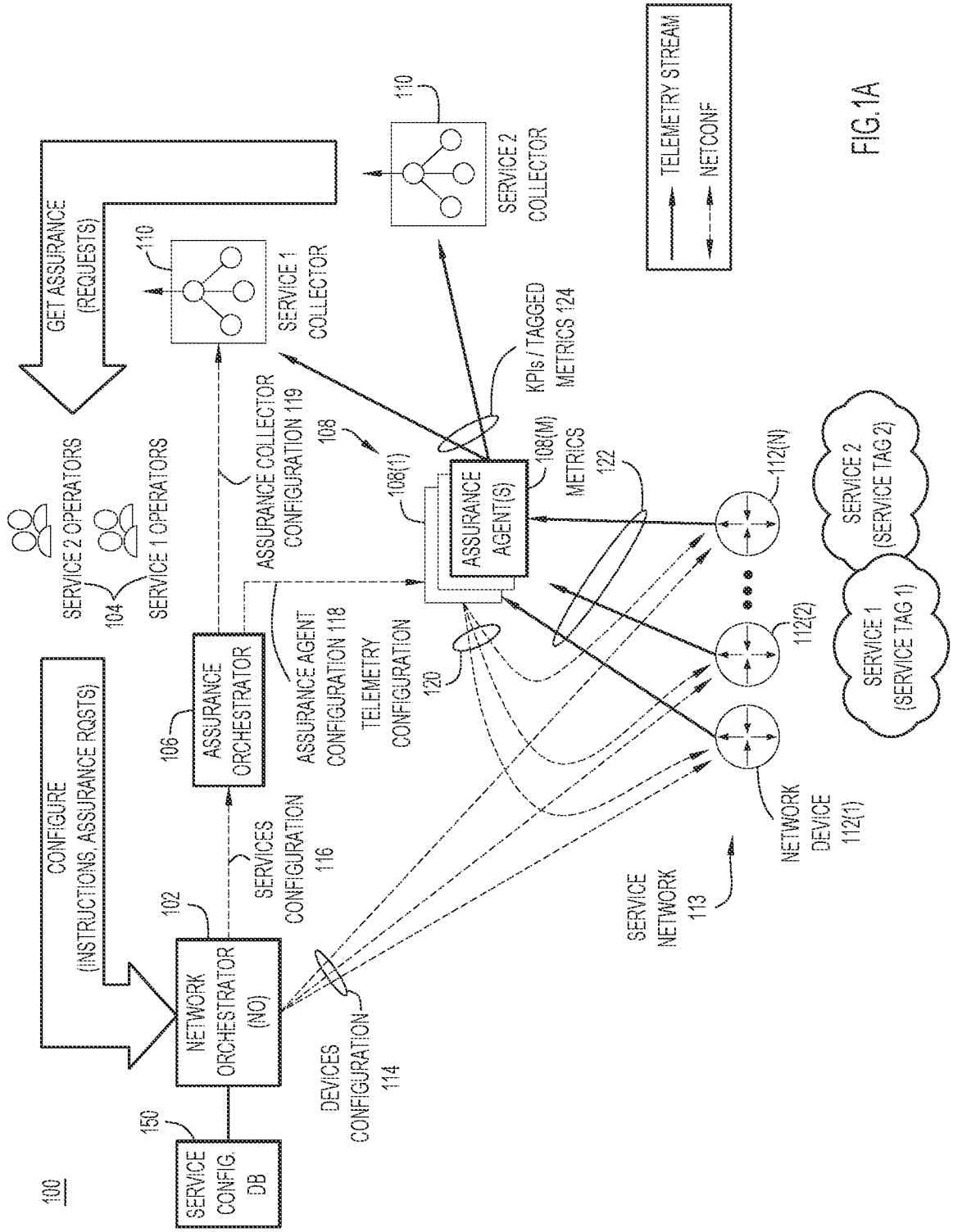
FIG. 1A is a block diagram of a network service assurance system or architecture (also referred to as a "service assurance system"), according to an example embodiment.

With reference to FIG. 1A, there is a block diagram of an example network service assurance system or architecture 100 (also referred to herein as a "service assurance system" 100). Service assurance system 100 may provide service assurance for intent-based networking (SAIN), for example. The service assurance system 100 leverages programming capabilities of network devices in the intent-based network (also referred to as a "service network" or simply a "network"), and model/event driven metrics in telemetry obtained from the network devices, to deliver end-to-end service assurance for various services. Service assurance system 100 includes a network orchestrator (NO) 102 (also referred to as a "service orchestrator 102"), service operators 104 to provide instructions to the network orchestrator 102, an assurance orchestrator 106 that communicates with the network orchestrator 102, assurance agents 108(1)-108(M) (collectively, "assurance agents" 108) that communicate with the assurance orchestrator 106, assurance collectors 110 that communicate with the assurance agents 108 and the service operators 104, and network devices 112(1)-112(N) (collectively, "network devices" 112) that communicate with the network orchestrator 102 and the assurance collectors 110. Network orchestrator 102 configures network devices 112(1)-112(N) to implement an intent-based service network 113 enabled to provide a variety of services to end users. Network devices 112 may include routers, switches, gateways, and other network devices (physical or virtual). Assurance orchestrator 106, assurance agents 108, and assurance collectors 110 are generally referred to as one or more "assurance entities" (or simply "entities") configured to provide assurance for services on a network.

Network orchestrator 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by network orchestrator 102. Similarly, assurance collectors 110 may also include applications and/or services hosted on one or more servers, which may be the same as or different from the servers used by assurance orchestrator 106. In an embodiment, assurance collectors 110 are applications integrated into assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. Network orchestrator 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1A, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to network orchestrator 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to network orchestrator 102.

Network Orchestrator

Responsive to the aforementioned instructions and the requests sent by service operators 104, network orchestrator 102 derives and sends to network devices 112 intent-based network device configuration information 114 to configure the network devices/service network 113 for the services (e.g., for service 1 and service 2). In addition, network orchestrator 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and configuration information that describes how the service is actually implemented of service network 113. That is, the definition of the configuration of the service is reflective of how the service is instantiated as a collection of the subservices in service network 113.

For network device configuration information 114, network orchestrator 102 may employ, for example, the Network Configuration Protocol (NETCONF) (or, similarly, Representational State Transfer (REST) Configuration (RESTCONF)) in a NETCONF compliant session to push intent-based network device configuration objects, such as Yet Another Next Generation (YANG) models or objects, to network devices 112. Similarly, for services configuration information 116, network orchestrator 102 may also employ, for example, NETCONF to push intent-based service configuration YANG objects to assurance orchestrator 106. YANG is a data modeling language used to define data sent over a NETCONF compliant network to configure resources. NETCONF is used to install, manipulate, and delete configurations of the resources, while YANG is used to model both configuration and state data of the resources. YANG models/objects used to implement embodiments presented herein may include YANG models/objects extended to include service-specific metadata annotations in accordance with RFC 7952, for example, or any other format that may be the subject of a future standard. More generally, network orchestrator 102 may employ client-server sessions to configure network devices 112, in which case the network orchestrator may operate as a client and the network devices may operate as servers.

Network orchestrator 102 configures a wide range of different subservices on one or more of network devices 112 to enable/support each of the services on service network 113. To do this, network orchestrator (i) generates subservice configuration information that includes network device configuration commands/instructions and associated configuration parameters for the subservices to be configured, and (ii) pushes the subservice configuration information to network devices 112 in network device configuration information 114, as mentioned above. Network orchestrator 102 also provides the subservice configuration information to assurance orchestrator 106 in service configuration information 116, as mentioned above.

Figure 1B:
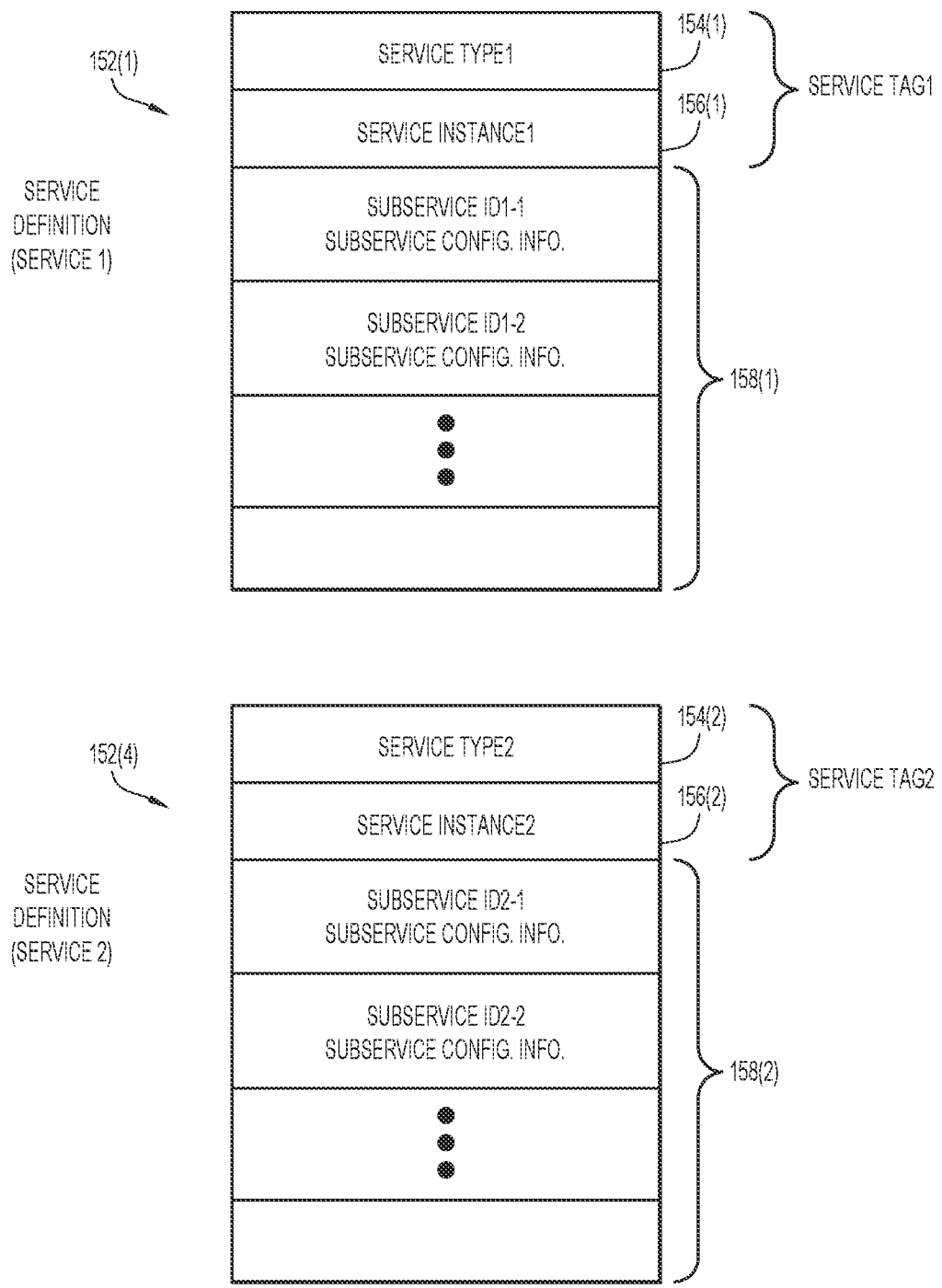
FIG. 1B is an illustration of a service configuration database in the network assurance system, according to an example embodiment.

Network orchestrator 102 stores in a service configuration database (DB) 150 a definition of each of the services that the network service orchestrator configures on service network 113. In an example, service configuration database 150 may be hosted on network orchestrator 102. With reference to FIG. 1B, there is an illustration of an example of service configuration database 150. In the example of FIG. 1B, service configuration database 150 stores definitions 152(1) and 152(2) (also referred to as "service definitions") for service 1 and service 2, from FIG. 1A. Each definition 152(i) may be similar to or the same as the definition of a service described above. Each definition 152(i) may include a service type 154(i) and a service instance 156(i) for the service to which the service definition pertains, and configuration information 158(i) that describes how that service is actually implemented/configured on service network 113. More specifically, configuration information 158(i) for a given service includes, for each of the subservices of the given service, a respective subservice identifier (ID) (e.g., subservice ID1-1, subservice ID1-2, and so on), and respective subservice configuration information (e.g., specific operations and/or intent-based network device configuration objects used to configure that subservice on a network device). Network orchestrator 102 may use a service type, a service instance, and a subservice identifier of a subservice as indexes into service configuration database 150 to search for and find respective subservice configuration information for the subservice.

Non-limiting examples of subservices that network orchestrator 102 may configure include layer 1 (L1), layer 2 (L2), and layer 3 (L3) connections/interfaces, packet routing protocols, logical network overlays such as equal-cost multi-path routing (ECMP), and subservices related to traffic shaping. Non-limiting examples of operations employed by network orchestrator 102 to configure the aforementioned example subservices, on a network device among network devices 112, are provided below.

To configure an L1 connection/interface:
 a. Enter L1 interface configuration mode.
 b. Configure on the network device components and interface parameters, including hardware parameters, memory buffers, optical transmit power, and optical encoding/modulation employed by optical interfaces on the network device.
 c. Exit the L1 interface configuration mode.

To configure an L2 connection/interface:
 a. Select a type of interface (i.e., L2, virtual LAN (VLAN), port-channel).
 b. Enter L2 interface configuration mode.
 c. Assign a media access control (MAC) address, a maximum transmission unit (MTU), and an L2 Quality-of-Service (QoS) classification (referred to simply as "QoS").
 d. Enable the L2 interface (no shutdown/enable L2 interface command).
 e. Exit the L2 interface configuration mode.

To configure an L3 connection/interface:
 a. Select a type of interface (i.e., L3).

b. Enter L3 interface configuration mode.
c. Assign an Internet Protocol (IP) address, an L3 MTU, and an L3 QoS.
d. Enable the L3 interface (no shutdown/enable L3 interface command).
e. Exit the L3 interface configuration mode.

To configure a packet routing protocol (e.g., Intermediate System to Intermediate System (IS-IS)):
a. Check for pre-requirements of the packet routing protocol:
  i. IP address configured on at least one interface.
  ii. IP routing process running for an address family (e.g., IPv4, IPv6).
b. Enter interface configuration mode for packet routing protocol.
c. Select a routing protocol (e.g., IS-IS) and start a routing protocol process on the network device (e.g., router Routing Information Protocol (RIP), router Open Shortest Path First (OSPF)).
d. Assign interfaces to include routing advertisements (selects IP networks for the advertisements).
e. Assign an IP address, an L3 MTU, and an L3 QoS.
f. Exit the interface configuration mode.

To configure ECMP:
a. Identify parallel links or parallel multi-paths and associated network device interfaces for ECMP.
b. Enter ECMP configuration mode.
c. Enter interface or routing configuration mode
  i. Configure equal costs among interfaces identified in step (a) (e.g., configure Routing Information Base (RIB), Forwarding Information Base (FIB) accordingly).
d. Exit the ECMP configuration mode.

To configure traffic shaping as its own subservice or as a sub-component of another subservice, e.g., an interface:
a. Identify classes of network traffic (e.g., policy-map/class-map).
b. Define shaping, specifying peak/average of traffic, and bursting profile.
c. Enter interface (or permanent virtual circuit (PVC)) configuration mode.
d. Applying the above-defined shaping to an interface.
e. Exit interface configuration.

The subservices and operations to configure the subservices listed above are provided by way of example, only, and may be modified and/or expanded to include additional subservices and operations, as would be appreciated by one of ordinary skill in the relevant arts having read the present specification.

Assurance Orchestrator

Returning to FIG. 1A, assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of subservices and dependencies/interdependencies between the subservices that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover subservices, such as packet routing protocols, implemented on the network devices and that are to be incorporated into the subservice dependency graph.

In a non-limiting embodiment, the subservice dependency graph includes a subservice dependency tree having a root node that represents the services, and nodes that represent the subservices and that have parent-child relationships (i.e., the dependencies) between the nodes/subservices that lead back to the root node. An example of a subservice dependency tree is described below in connection with FIG. 6. Other types of graph constructs/data structures may be used to represent the subservice dependency graph, as would be appreciated by one of ordinary skill in the art having read the present specification.

Third, assurance orchestrator 106 derives from each subservice dependency graph a respective set of heuristic packages for the service described by the subservice dependency graph. The heuristic packages (i) specify/define service-related metrics (i.e., subservice metrics) to be monitored/recorded and reported by the subservices, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the subservice dependency graphs to assurance collectors 110 in assurance collector configuration information 119.

Assurance Agents

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the subservice metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG-modeled objects for purposes of monitoring (also referred to as "YANG monitoring objects") to network devices 112.

In response to receiving the monitoring objects in telemetry configuration information 120, network devices 112 record the subservice metrics specified in the monitoring objects, and report the subservice metrics (labeled as "metrics" 122 in FIG. 1A) back to assurance agents 108 in telemetry streams. In an example, the telemetry streams carry subservice metrics 122 in telemetry objects corresponding to the monitoring objects, as described below in connection with FIG. 2B. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1A). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of health states of the subservices) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance Collectors

Assurance collectors 110 receive/collect service-tagged subservice metrics 124, and health states of the subservices when available, from assurance agents 108 for various services, as uniquely identified by the service tags with which the subservice metrics are tagged. Assurance collectors 110 associate service-tagged subservice metrics 124 with respective ones of the various services based on the service tags. Assurance collectors 110 determine a respective overall health state of each service based on the health states of the subservices of the service, as indicated by the service-tagged subservice metrics and their KPIs/health states. When assurance agents 108 do not provide to assurance collectors 110 health states of the subservices along with service-tagged subservice metrics 124, assurance collectors 110 compute the health states of the subservices from the service-tagged subservice metrics 124 as instructed by corresponding ones of the heuristic packages (e.g., by the heuristic packages tagged with the same service tag as the subservice metrics).

NETCONF/YANG (Object-Based) Implementation in Assurance System

Figure 2A:
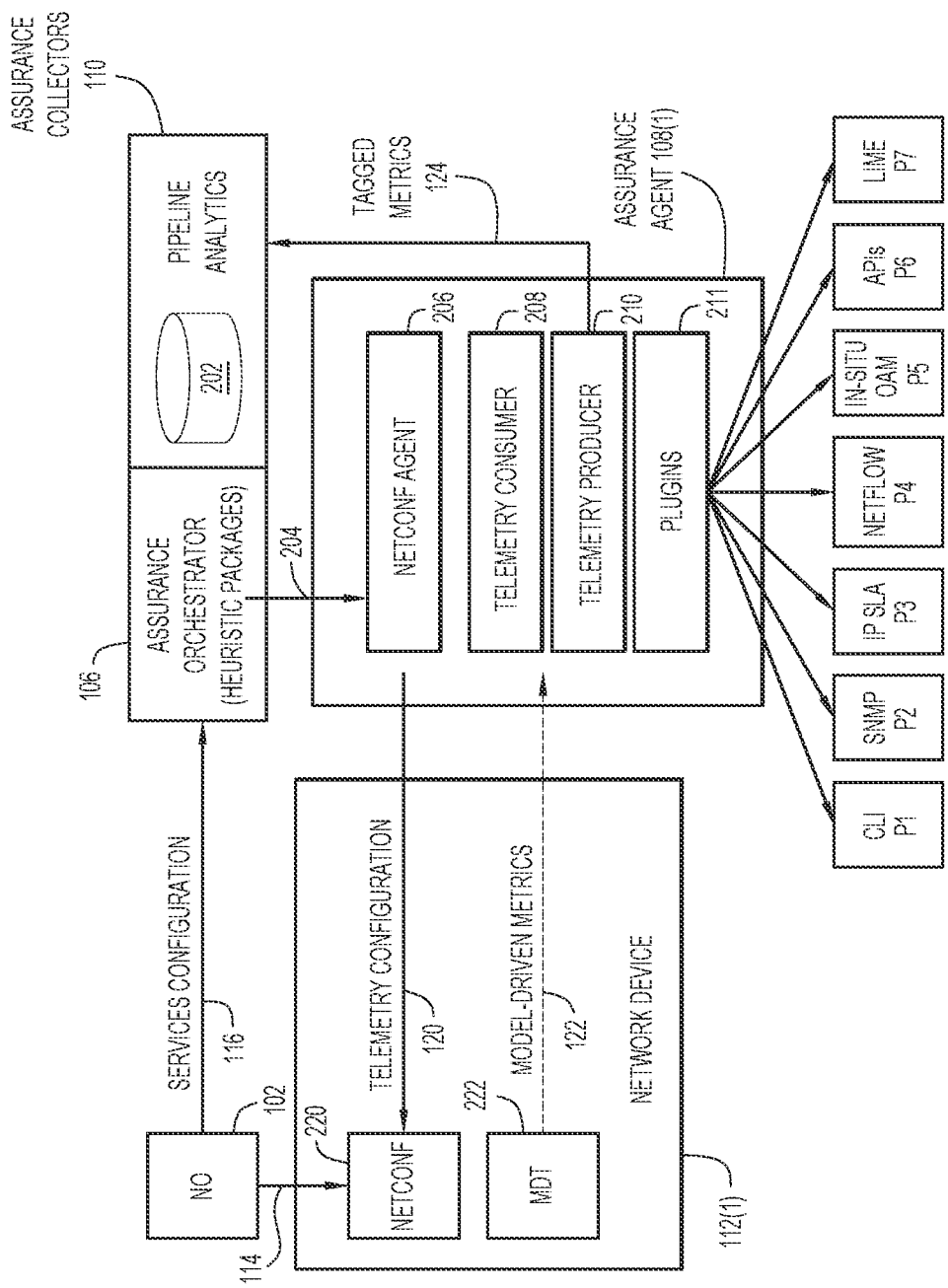
FIG. 2A is a block diagram that shows additional details of an assurance orchestrator, a representative assurance agent, and a representative network device of the service assurance system, according to an example embodiment.

With reference to FIG. 2A, there is a block diagram that shows additional details of assurance orchestrator 106, assurance collectors 110, a representative assurance agent (e.g., assurance agent 108(1)), and a representative network device (e.g., network device 112(1)) from FIG. 1A. Assurance collector 110 includes pipeline analytics 202 to analyze service-tagged subservice metrics 124 including the KPIs (if any) from assurance agents 108, to determine health states of the subservices and then service health states based on the health states of the subservices.

Assurance agent 108(1) includes a NETCONF agent 206, a telemetry consumer 208, a telemetry producer 210, and plugins 211. Plugins 211 provide various functional capabilities to assurance agent 108(1) to assist with tasks/operations performed by the assurance agent, including communicating with entities external to the assurance agent. Examples of plugins 211 include, but are not limited to, one or more of the following: a command line interface (CLI) plugin P1; a Simple Network Management Protocol (SNMP) plugin P2; an IP service-level agreement (SLA) plugin P3; a NetFlow™ protocol plugin to communicate with NetFlow-enabled network devices P4; an in-situ operations, administration, and maintenance (IOAM) plugin P5 to provide real-time telemetry of individual data packets and flows; application programming interfaces (APIs) P6; and Layer Independent OAM Management in the Multi-Layer Environment (LIME) P7.

NETCONF agent 206 digests heuristic packages 204 sent by assurance orchestrator 106. NETCONF agent 206 generates monitoring objects (in telemetry configuration information 120) as network device configuration YANG objects based on the heuristic packages, and pushes the monitoring objects to network device 112(1) to configure the network device for model-driven telemetry (MDT) used to report recorded subservice metrics. NETCONF agent 206 may include in the monitoring objects respective identifiers of the subservices to which the monitoring objects pertain (e.g., an identifier of network device 112(1), since the network device is a subservice), and the service tag for the service to which the subservice pertains. Telemetry consumer 208 receives from network device 112(1) subservice metrics 122 recorded in (model-driven) telemetry objects corresponding to the monitoring objects. The telemetry objects include the subservice metrics, the identifier of the subservice (e.g., the identifier of network device 112(1)) to which the subservice metrics pertain, and may also include the service tag copied from the corresponding monitoring object. Telemetry consumer 208 passes the (received) telemetry objects to telemetry producer 210. Telemetry producer 210 tags the (received) telemetry objects with service tags, as mentioned above, and sends resulting service-tagged telemetry objects (representing service-tagged subservice metrics 124) to assurance pipeline analytics 202 of assurance collectors 110, and optionally to assurance orchestrator 106. Telemetry producer 210 may also copy into the service-tagged telemetry objects any KPIs/health states of subservices computed by assurance agent 108(1) in the embodiment in which the assurance agent computes that information.

Network device 112(1) includes a NETCONF agent 220 and an MDT producer 222. NETCONF agent 220 receives network device configuration information 114 from network orchestrator 102 and configures subservice(s) on network device 112(1) based on the network device configuration information. NETCONF agent 220 also receives the monitoring objects from NETCONF agent 206, and configures the network device, including MDT producer 222, based on the monitoring objects. MDT producer 222, records its local subservice metrics and its subservice identifier in telemetry objects as instructed by the monitoring objects, and may optionally include the corresponding service tags in the telemetry objects, and reports the telemetry objects to telemetry consumer 208.

Distributed Assurance System

Figure 2B:
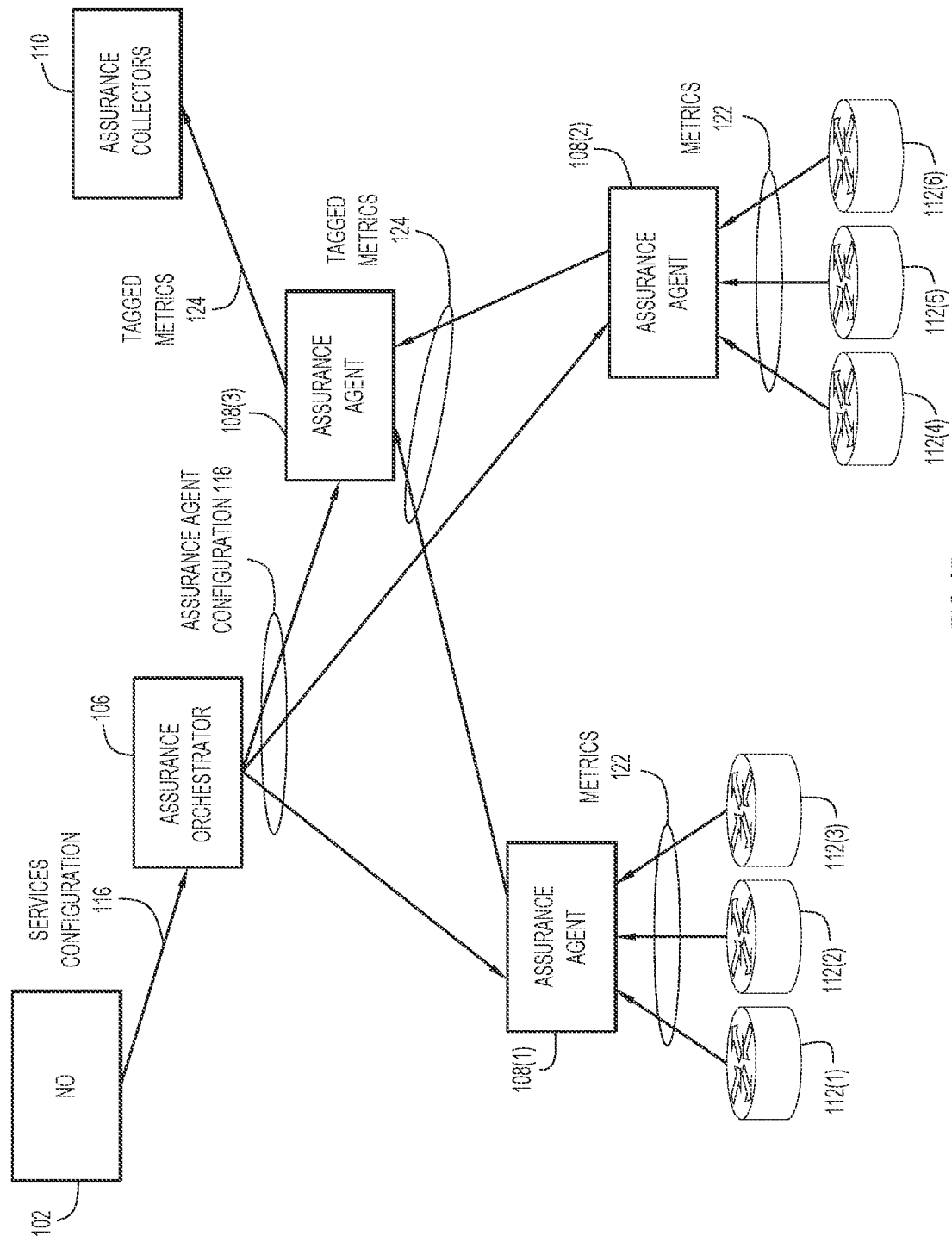
FIG. 2B is a block diagram that shows a distributed arrangement of assurance agents and network devices of the service assurance system, according to an example embodiment.

With reference to FIG. 2B there is a block diagram that shows an example of a distributed arrangement of assurance agents 108 and network devices 112 of service assurance system 100. In the example of FIG. 2B, assurance agent 108(1) is co-located with network devices 112(1)-112(3) at a first geographical location and assurance agent 108(2) is co-located with network devices 112(4)-112(6) at a second geographical location separated from the first geographical location. Service 1 (see FIG. 1A) may be implemented on network devices 112(1)-112(3), and Service 2 may be implemented on network devices 112(4)-112(6). Geographically distributed assurance agents 108(1) and 108(2) report their service-tagged telemetry objects to centralized assurance agent 108(3), which forwards the service-tagged subservice metrics to assurance collector 110.

Figure 4:
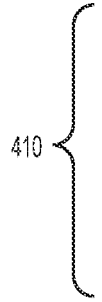
FIG. 4 is an illustration of service configuration information for a second network device and an interface on the second network device for the specific service, according to an example embodiment.

Examples of service configuration information 116 for a service instance "xyz" (e.g., for a customer xyz) of service type L2 virtual private network (VPN) L2VPN, which is a peer-to-peer (p2p) connectivity type (i.e., L2VPN-p2p), are now described with reference to FIGS. 3-5. In FIGS. 3-5, the example service configuration information is represented as eXtensible Markup Language (XML) encoding of YANG models.

Service Configuration Information/Definition Examples

With reference to FIG. 3, there is an illustration of first example service configuration information 300 for a first network device and an interface of service instance xyz. More specifically, lines 302 introduce a "GigabitEthernet" interface for/on a first provider edge (PE) network device "sain-pe-1" (e.g., a router) for service instance xyz of type "l2vpn" indicated at line 304. As indicated at lines 302, first network device sain-pe-1 is running an XR operating system, by Cisco. Line 306 provides an identifier "0/0/0/3" for the GigabitEthernet interface. Line 308 defines a maximum transmission unit (MTU) for the interface. Groups of lines 310 and 312 define parameters for IPv4 and IPv6 addresses configured on the interface.

With reference to FIG. 4, there is an illustration of second example service configuration information 400 for a second network device of service instance xyz. More specifically, lines 402 introduce a second PE network device "sain-pe-2" (e.g., a router) for service instance xyz of type "l2vpn" indicated at line 406. Line 408 defines a QoS classification, as default, for traffic handled by the network device sain-pe-2. Alternatively, or additionally, service configuration information 400 may define a Quality-of-Experience (QoE) classification. Lines 410 define a policy rate for network device sain-pe-2.

With reference to FIG. 5, there is an illustration of third example service configuration information 500 for a first cross-connect ("xconnect") associated with second network device sain-pe-2 for service instance xyz. An "xconnect" is a L2 pseudowire (L2 PW) used to create L2 VPNs (L2VPNs). Examples of xconnects are provided at www.amazon.com/Layer-VPN-Architectures-Networking-Technology-ebook/dp/B0051TM5BM, authored by C. Pignataro. In the present context of service assurance, "xconnect" refers to a syntax of a command used to realize the pseudowire in, for example, a Cisco internetwork operating system (IOS)-XR/IOS-XE operating system.

Lines 502 associate second network device sain-pe-2 with service instance xyz. Lines 504 define the first xconnect, which is associated with a GigabitEthernet subinterface 0/0/0/2.600 at line 506 and with an IPv4 address 192.0.2.17 at line 508.

Subservice Dependency Graph Example

Figure 6:
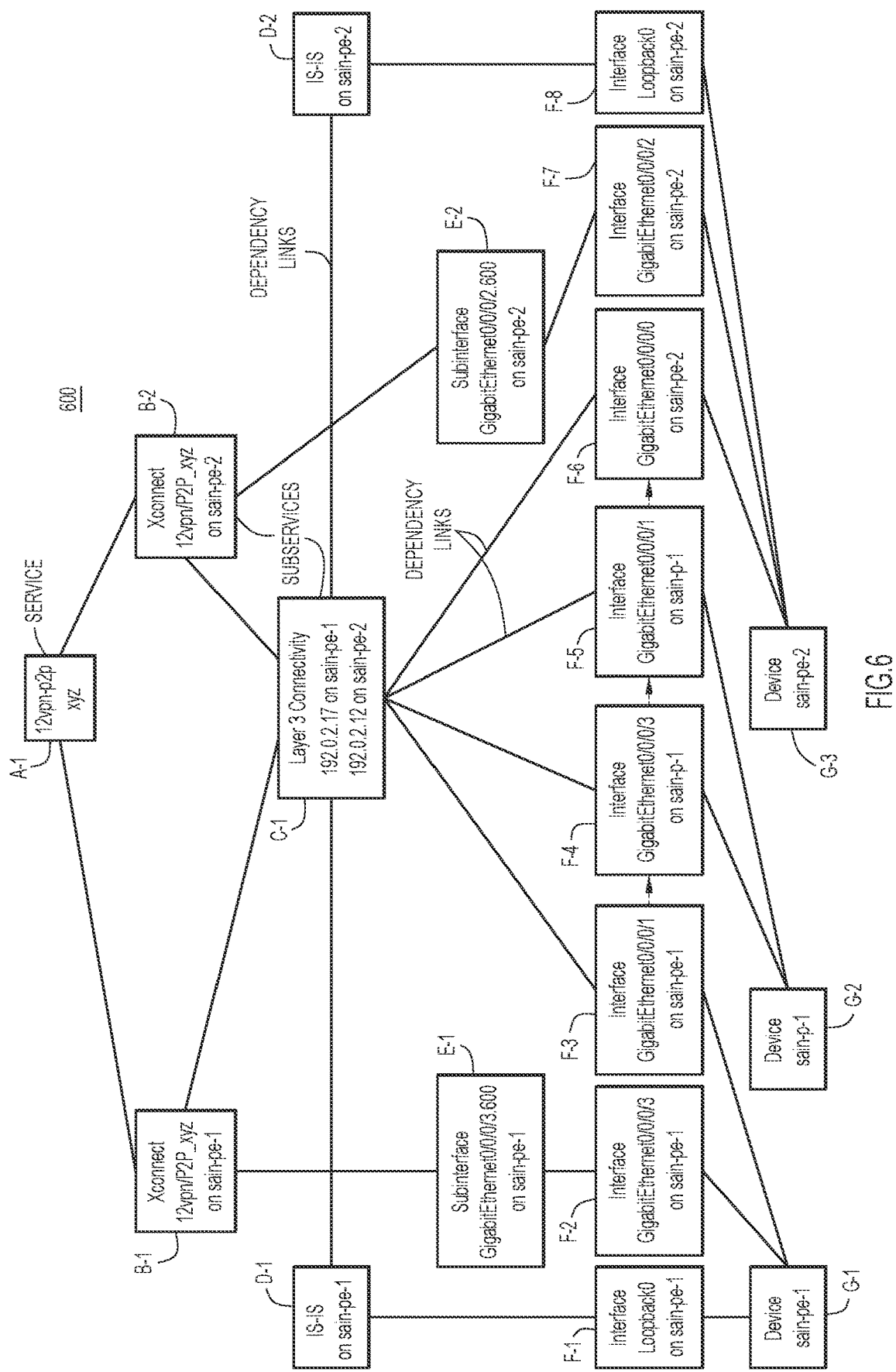
FIG. 6 is an illustration of a subservice dependency graph, in an example form of a subservice dependency tree, for a service, according to an example embodiment.

With reference to FIG. 6, there is an illustration of an example subservice dependency graph in the form of a subservice dependency tree 600 for service L2VPN-p2p, meaning an L2 VPN for a peer-to-peer connection. Subservice dependency tree 600 (or "tree" for short) includes a service node A-1 at a highest level of the tree. Service node A-1 identifies/represents the service by a service tag tuple that includes service type and service instance, e.g., tuple <service type, service instance>. In the example of FIG. 6, service node A-1 represents service <L2VPN-p2p, xyz>. Lower levels of tree 600 are populated with subservice nodes (shown as boxes) that identify/represent respective subservices of the service <L2VPN-p2p, xyz>, and that connect back to service node A-1 through subservice dependencies or parent-child links (shown as lines connecting boxes that depend on each other). Each of the subservice nodes includes an identifier (e.g., a plain text identifier, as depicted in FIG. 6) of the subservice represented by that subservice nodes. In the example of FIG. 6, the lower levels of tree 600 include:

a. A second level that includes subservice nodes B-1 and B-2 for xconnect subservices implemented on network devices sain-pe-1 and sain-pe2;

b. A third level that includes a subservice node C-1 for an L3 network connectivity subservice with components on network devices sain-pe-1 and sain-pe2.

c. A fourth level that includes subservice nodes D-1 and D-2 for routing protocol subservices (e.g., IS-IS) on network devices sain-pe-1 and sain-pe-2.

d. A fifth level that includes subservice nodes E-1 and E-2 for subinterface subservices on network devices sain-pe-1 and sain-pe-2.

e. A sixth level that includes subservice nodes F-1-F-8 for interface subservices on network devices sain-pe-1 or sain-pe-2, as indicated.

f. A seventh level that includes subservice nodes G-1-G3 for network devices sain-pe-1 and sain-pe-2 as subservices as indicated.

In one example branch of subservice dependency tree 600, service <L2VPN-p2p, xyz> depends on the subservice of subservice node B-1, which depends on the subservice of subservice node E-1, which depends on the subservice of subservice node F-2, and so on down the levels of the tree. As indicated by the subservice links, a given subservice may depend on multiple other subservices. Traversing the levels of tree 600 downward from the highest level to the lowest level of the tree, the subservices of service <L2VPN-p2p, xyz> include network xconnects on network devices (e.g., on sain-pe-1 and sain-pe-2), L3 network connectivity on the network devices (L2 network connectivity on the network devices may also be a subservice), routing protocols on the network devices, interfaces of the network devices, subinterfaces of the network devices, and the network devices themselves.

Generally, the subservices include: xconnects on network devices; L1 (e.g., optical), L2, and L3 network connectivity on the network devices; routing protocols on the network devices; interfaces of the network devices; subinterfaces of the network devices; communication behavior of the interfaces and the subinterfaces; the network devices themselves and operations performed on/by the network devices. Subservices also include logical network functions and groupings of logical and physical elements, such as: ECMP/ECMP groups of network devices; network tunnels; link protection functions executing in a network; network device protection functions executing in a network; and logical overlays on a physical network.

Logical overlays may include: link aggregation for a link aggregation group (LAG); Virtual Extensible (Vx) LAN (VxLAN); VxLAN-Generic Protocol Extension (GPE); Generic Routing Encapsulation (GRE); service function chaining (SFC) functionality including Network Service Header (NSH) implementation; and Multiprotocol Label Switching (MPLS); for example. The subservices may also include applications such as application categorization as per RFC 6759. The subservices may also include one or more multicast subnets on network devices.

Heuristic Packages

Examples heuristic packages are now described in connection with FIGS. 7-9.

Figure 7:
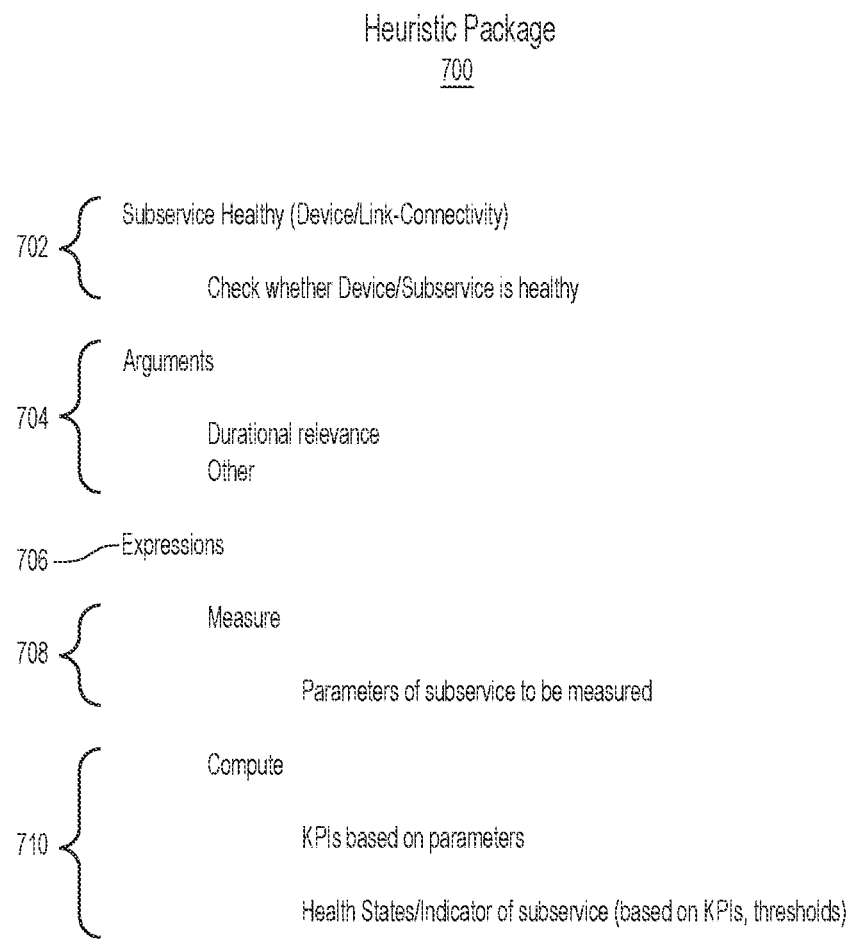
FIG. 7 is an illustration of a generalized heuristic package generated based on a subservice dependency graph, according to an example embodiment.

With reference to FIG. 7, there is an illustration of an example generalized heuristic package 700 generated based on a subservice dependency graph. Heuristic package 700 includes a header 702 that identifies a subservice of the subservice dependency graph that is targeted by the heuristic package, and an overall function for which the heuristic package is to be used. For example, header 702 may identify any specific one of xconnect, L3 connectivity, routing protocol, subinterface, interface, or network device, and the header may specify that the heuristic package is to be used to determine a health of the indicated subservice.

Heuristic package 700 may include arguments 704, which indicate various conditions under which the heuristic package is to be used, such as a time duration over which the subservice is to be monitored. Heuristic package 700 also includes expressions 706, which include measure 708 and compute 710. Measure 708 specifies subservice metrics of the subservice that are to be recorded. For example, for a network device subservice, the subservice metrics may include central processor unit (CPU) usage, free memory, temperature, power, and the like. For an interface of the network device, the subservice metrics may include traffic rate, and so on. Compute 710 provides rules and/or instructions to compute KPIs based on the subservice metrics, and instructions to determine a health state for the subservice, such as thresholds against which computed values are to be compared to determine the health state.

Compute 710 may include rules to compute a health state that is binary, i.e., a health state that indicates either a passing health state when the subservice is operating properly (e.g., meets a desired performance level) or a failing health state (which is a degraded health state) when the subservice is not operating properly (e.g., does not meet the desired performance level). Alternatively, the rules may compute a health state that is graded, i.e., a health state that indicates a health state within a range of possible health states from passing to failing, e.g., including a passing health state, a failing health state, and a degraded health state that is not a passing health state or a failing health state (in this case, degraded means between passing and failing). In an example, the health states may include the following computed health state values: failing=0, 0<degraded<1, passing=1.

Figure 8:
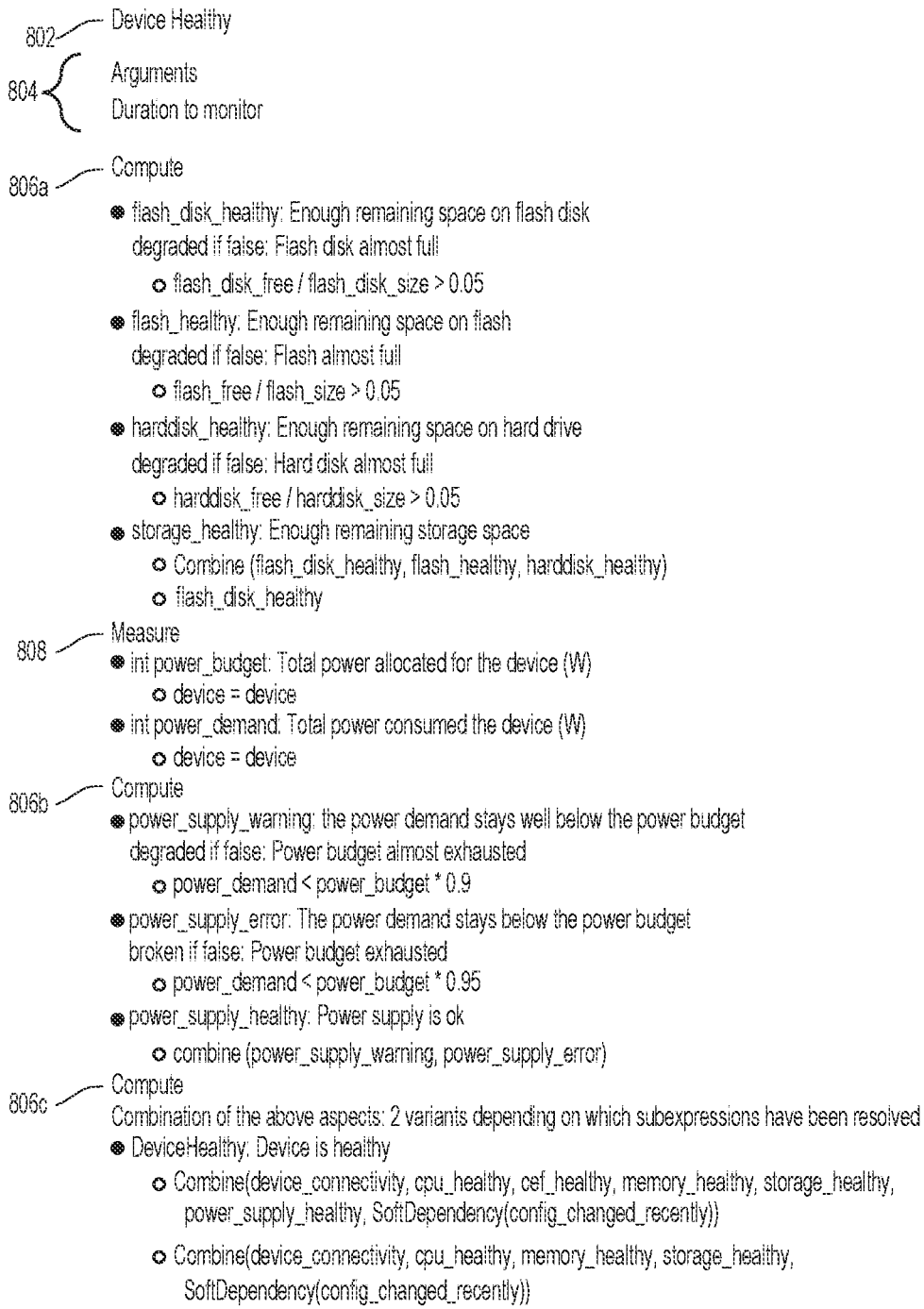
FIG. 8 is an illustration of a heuristic package for a network device used by a service, according to an example embodiment.

With reference to FIG. 8, there is an illustration of an example heuristic package 800 for a network device subservice. Heuristic package 800 includes header 802 and arguments 804. Heuristic package 800 includes compute 806a to compute health indicators (KPIs) for a flash disk, flash, a hard disk, and storage, generally. For example, compute 806a includes rules to set the health state to indicate a degraded health state if memory of a flash disk is full, and further rules to evaluate the following Boolean operation: flash_disk_free/flash_disk_size>0.05, and so on. Heuristic package 800 includes measure 808 that lists power metrics to be measured (e.g., power demand), and compute 806b to compute health states based on the power metrics. Heuristic package 800 also includes compute 806c to compute an overall health state (KPI) for the network device based on values computed in prior computes 806a and 806b. That is, compute 806c defines a rule expression to evaluate the overall health state of the subservice based on the subservice metrics and the computed (intermediate) values mentioned above.

With reference to FIG. 9, there is an illustration of an example heuristic package 900 for a network protocol (e.g., IS-IS) subservice implemented on a network device. Heuristic package 900 includes header 902 and arguments 904. Heuristic package 900 includes measure 906 to measure metrics associated with IS-IS, including to determine lists of valid IPv4 and IPv6 IS-IS routes on the network device (e.g., from a forwarding or routing table in the network device). Heuristic package 900 includes compute 908 to compute KPIs that include various counts and stabilities of the IPv4 and the IPv6 IS-IS routes based on the metrics from measure 906, and to compute an overall health state 910, which is also a KPI, for IS-IS based on previously computed values/KPIs.

Assurance Collector Operations and User Interfaces

Further operations of assurance collectors 110 are now described in connection with FIGS. 10 and 11, and with reference again to FIG. 1A. As mentioned above, assurance collectors 110 receive/collect service-tagged subservice metrics 124 from assurance agents 108 for various services, subservice dependency graphs for the various services, and heuristic packages for the various services. The subservice dependency graphs each includes the service tag for the service to which the subservice dependency graph pertains. The heuristic packages each includes the service tag to which the heuristic package pertains. Assurance collectors 110 associate all service-tagged subservice metrics 124 (and health states of subservices when available) tagged with a given service tag to the subservice dependency graphs that includes the given service tag, and to the heuristic packages that include the given service tag. In other words, assurance collectors 110 associate all service-tagged subservice metrics 124 (and health states of subservices), subservice dependency graphs, and heuristic packages that have a matching (i.e., the same) service tag to each other and to the service identified by that service tag.

For each service, assurance collectors 110 may populate the subservice dependency graph with corresponding health states of the subservices of the subservice dependency graph as represented by the service-tagged subservice metrics. For example, assurance collectors 110 may populate the nodes of a subservice dependency tree for the service with the health states of the subservices represented by the nodes. In an embodiment in which assurance agents 108 provide the health states of the subservices along with the service-tagged subservice metrics to assurance collectors 110, the assurance collectors may populate the subservice dependency tree with the provided health states. Alternatively, assurance collector 110 computes the health states of the subservices from the corresponding service-tagged subservice metrics 124 in accordance with the corresponding heuristic packages, and then populates the subservice dependency tree with the health states as computed.

The resulting subservice dependency graph, populated with health states of the subservices, may be generated for display to an administrator in a graph form (e.g., tree) or otherwise, e.g., as a list of subservices for the service. Also, for each service, assurance collectors 110 may determine an overall health state of the service (also referred to simply as a "health state" of the service) based on the health states of the subservices of the service. For example, if all of the subservices have health states that indicate passing health states, assurance collectors 110 may set the overall health state to indicate a passing overall health state. Alternatively, if the health states of one or more of the subservices indicate failing health states, assurance collectors 110 may set the overall health state to indicate a failing overall health state.

Figure 10:
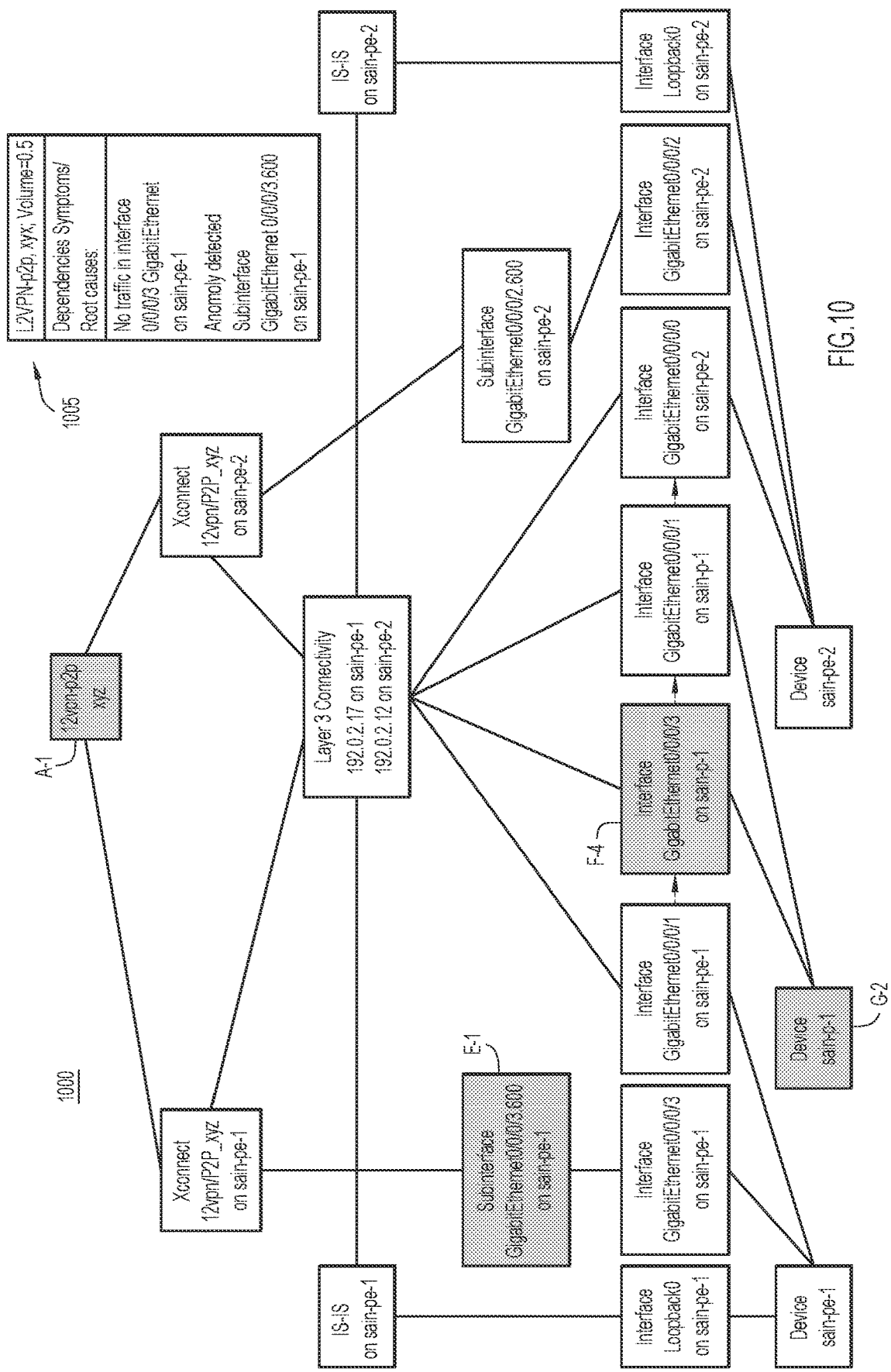
FIG. 10 is an illustration of a user interface (UI) generated for display by assurance collectors of the service assurance system based on an analysis of service-tagged subservice metrics belonging to a specific service, according to an example embodiment.

With reference to FIG. 10, there is an illustration of an example user interface (UI) 1000 generated for display by assurance collectors 110 responsive to collecting and analyzing service-tagged subservice metrics for the service L2VPN-p2p, xyz. UI 1000 includes subservice dependency tree 600 for the service, as described above, but with various subservices highlighted (e.g., with shaded) to indicate degraded health states (which may mean a failing health state or, alternatively, a degraded health state between failing and passing). Specifically, UI 1000 includes shading of subservices identified by subservice nodes E-1, F-4, and G-2, which indicates degraded health states for those subservices, i.e., assurance collectors 110 determined degraded health states of those subservices. Moreover, UI 1000 includes shading of the service L2VPN-p2p, xyz identified by service node A-1, which indicates a degraded overall health state of the service, i.e., assurance collectors 110 determined the degraded overall health state of the service based on the degraded health states of its subservices. In other example, different colors may distinguish passing health states (e.g., green) and degraded health states (e.g., orange).

UI 1000 also includes an information window or panel 1005 that provides health states and diagnostic information for the degraded subservices and the service.

With reference to FIG. 11, there is an there is an illustration of an example user interface (UI) 1100 generated for display by assurance collectors 110 responsive to collecting and analyzing service-tagged subservice metrics for multiple services. UI 1100 includes a panel 1102 that shows health states for two L1VPN-p2p services including service instances Customer A and Customer B, both degraded. UI 1100 includes a panel 1104 that shows health states for assurance agents 108. UI 1100 also includes a panel 1106 that indicates health states for Customer C and Customer D tunnel services, a panel 1108 that indicates a health state for a Customer E IPv6 service, and a panel 1110 that indicates a health state for a customer service.

Monitoring and Service-Tagged Telemetry Objects

Figure 12:
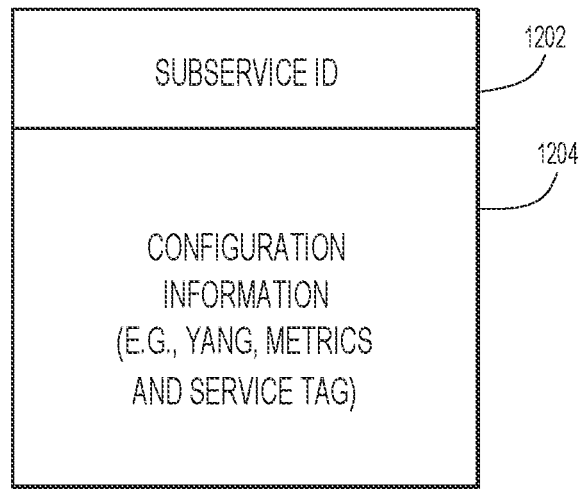
FIG. 12 is an illustration of a monitoring object used to configure a subservice of a service, according to an example embodiment.

With reference to FIG. 12, there is an illustration of an example monitoring object 1200. Monitoring object 1200 includes a subservice identifier (ID) 1202 and configuration information 1204. Configuration information 1204 may include YANG network device configuration information, for example, and identifies subservice metrics to be recorded and reported, in accordance with a heuristic package. Configuration information 1204 may include one or more configuration code snippets to configure a subservice, e.g., a network device, to perform the recording/reporting of the subservice metrics. For example, a heuristic package with instructions to monitor (memory) "space available" for MPLS in a network device running IOS-XR may result in the following command line interface (CLI) code snippet in a monitoring object destined for the network device:

```
CLIMetric:
    Command: show resource detail,
    regex_type: textfam,
    regex: ios_xr/show_oef_rsource_detail.txt,
    key: "space available"
    filter:
        "node"
        "mpls"
post_processing: convert2byte (GetTuple (value, 0), GetTuple (value, 1)
```

Alternatively, the monitoring object may include a YANG object that performs the same function as the CLI code snippet. Alternative, the monitoring object may include binary information such as a packet.

Monitoring object 1200 may also include a service tag for the service to which the subservice identified by the subservice ID pertains.

Figure 13:
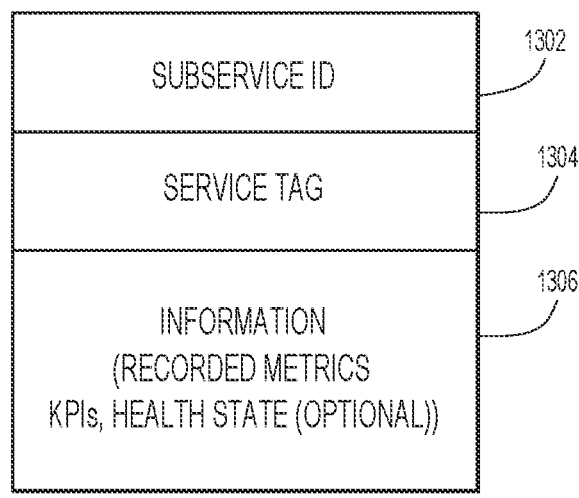
FIG. 13 is an illustration of a service-tagged subservice metrics in a form of a telemetry object corresponding to the monitoring object, according to an example embodiment.

With reference to FIG. 13, there is an illustration of an example service-tagged telemetry object 1300. Service-tagged telemetry object 1300 includes a subservice identifier 1302, a service tag 1304, and information 1306. Information 1306 includes recorded/reported subservice metrics, computed values, and KPIs (including a health state of a subservice) in accordance with a heuristic package from which a corresponding monitoring object was generated.

Service Assurance Operational Flow

Figure 14:
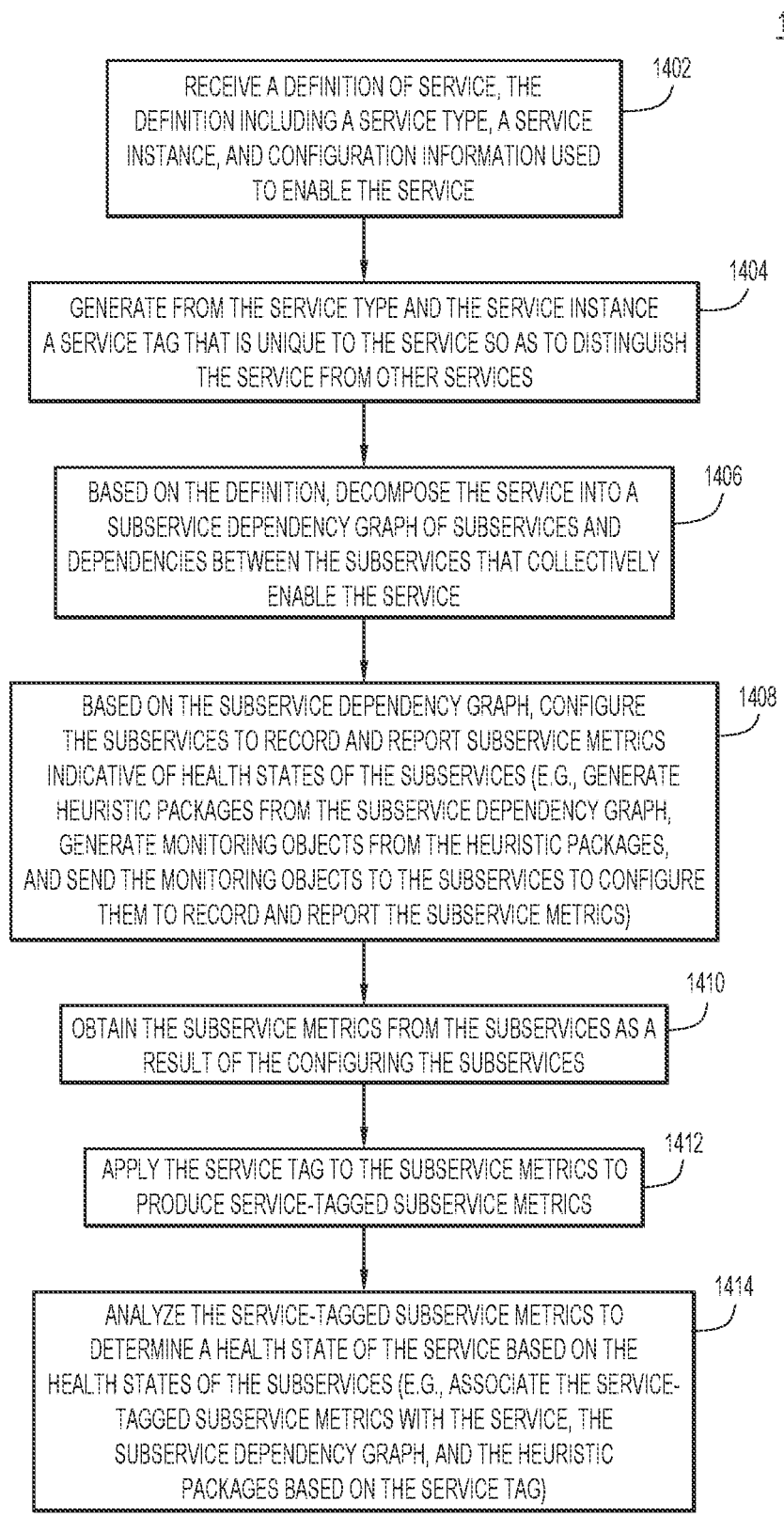
FIG. 14 is a flowchart of a method of performing assurance for a service enabled on a network, according to an example embodiment.

With reference to FIG. 14, there is a flowchart of an example method 1400 of performing assurance for a service enabled on a network. Method 1400 may be performed by a system including one or more entities to provide assurance for the service on the network. The one or more entities may include one or more of assurance orchestrator 106, assurance agents 108, and assurance collectors 110.

At 1402, a definition of a configuration of a service is received, e.g., by assurance orchestrator 106. The definition includes a service type, a service instance, and configuration information used to enable or implement the service in the network.

At 1404, a service tag is generated from the service type and the service instance. For example, assurance orchestrator 106 generates the service tag. The service tag identifies the specific instantiation of the service in the network, and is unique so as to distinguish the service from other services. The service tag may be a tuple that includes the service type and the service instance.

At 1406, based on the configuration information of the definition, the service is decomposed into a graph of subservices and dependencies between the subservices that collectively actually implement the service in the network. The service tag is applied to the subservice dependency graph. For example, assurance orchestrator 106 decomposes the service into the subservice dependency graph, and may provide the subservice dependency graph to assurance collectors 110.

At 1408, the subservices are configured to record and report subservice metrics indicative of health states of the subservices (e.g., a respective health state of each of the subservices) based on the subservice dependency graph. The health states may respectively indicate either a passing health state or a failing health state. Alternatively, the health states may respectively indicate a health state within a range of health states including a passing health state, a failing health state, and a degraded health state that is not a passing health state or a failing health state. Operation 1408 may include the following further operations:

a. Based on the subservice dependency graph, assurance orchestrator 106 generates heuristic packages, typically one per subservice, that specify the subservice metrics that the subservices are to record and report, and include rules to compute the health states of the subservices based on the subservice metrics. Assurance orchestrator 106 provides to assurance agents 108 the heuristic packages and the service tag.

b. Responsive to the heuristic packages, assurance agents 108 generate from the heuristic packages monitoring objects that define the subservice metrics that the subservices are to record and report, and provide the monitoring objects to the subservices to configure the subservices to record and report the subservice metrics.

At 1410, responsive to the configuring of 1408, the subservice metrics are obtained from the subservices. For example, responsive to the monitoring objects, the subservices record and then report to assurance agents 108 the subservice metrics in telemetry objects corresponding to the monitoring objects.

At 1412, the service tag is applied to the subservice metrics to produce service-tagged subservice metrics. For example, assurance agents 108 receive the telemetry objects, insert the service tag into the telemetry objects, and then send the (resulting) service-tagged telemetry objects to assurance collectors 110. Optionally, assurance agents 108 also analyze the subservice metrics to compute health states of the subservices in accordance with the rules in the heuristic packages, and insert the health states into the service-tagged telemetry objects before sending them to assurance collectors 110, which receive the service-tagged telemetry objects.

At 1414, the service-tagged subservice metrics are analyzed to determine a health state of the service. For example, assurance collectors 110 (i) associate the subservice metrics in the service-tagged telemetry objects with the service based of the service-tagged telemetry objects, (ii) analyze the subservice metrics to compute individual health states of the subservices (unless the health states are included with the service-tagged telemetry objects), e.g., one health state per subservice, based on the rules in the heuristic packages, and (iii) determine an overall health state of the service based on the individual health states of the subservices, which were associated with the service based on the service tags at (i). For example, if all of the health states of the subservices indicate passing health states, the overall health state may be set to indicate a passing overall health state. Alternatively, if one or more of the health states of the subservices indicate failing health states, the overall health state may be set to indicate a failing overall health state. Alternatively, if one or more of the health states of the subservices indicate degraded (not failing or passing) health states, and there are no failing health states, the overall health state may be set to indicate a degraded (not failing or passing) overall health state.

In addition, assurance collectors 110 populate indications of the subservices in the subservice dependency graph with their respective health states, and generate for display the populated subservice dependency graph to provide visual feedback. In various embodiments, operations performed by assurance collectors 110 as described above may be shared between the assurance collectors and assurance orchestrator 106. In another embodiment in which assurance collectors 110 are omitted, assurance agents 108 send service-tagged subservice metrics (and health states) directly to assurance orchestrator 106, and the assurance orchestrator performs all of the operations performed by the assurance collectors as described above. That is, assurance orchestrator 106 operates as the assurance orchestrator and assurance collectors 110.

In an environment that includes multiple services, method 1400 is performed for each service, by the one or more entities, to produce, for each service, respectively, a unique service tag, a subservice dependency graph, heuristic packages, monitoring objects, telemetry objects, tagged telemetry objects, health states of subservices, and an overall service health state. The one or more entities use the unique service tags to distinguish between the services and the aforementioned information generated for the services.

Closed Loop Automation for Intent-Based Networking

Closed loop automation for intent-based networking is now described. Closed loop automation for intent-based networking discovers an overall health state of a service comprising a collection of subservices based on health states of the subservices, using techniques described above, for example. If the closed loop automation discovers that the overall health state of the service (also referred to as the "service health state") indicates a failing overall health state, the closed loop automation reconfigures the subservices so that the overall health state indicates a passing overall health state. In other words, the closed loop automation provides feedback to "close the loop" in service assurance system 100 to restore the overall health state of the service to an acceptable, passing overall health state.

Figure 15:
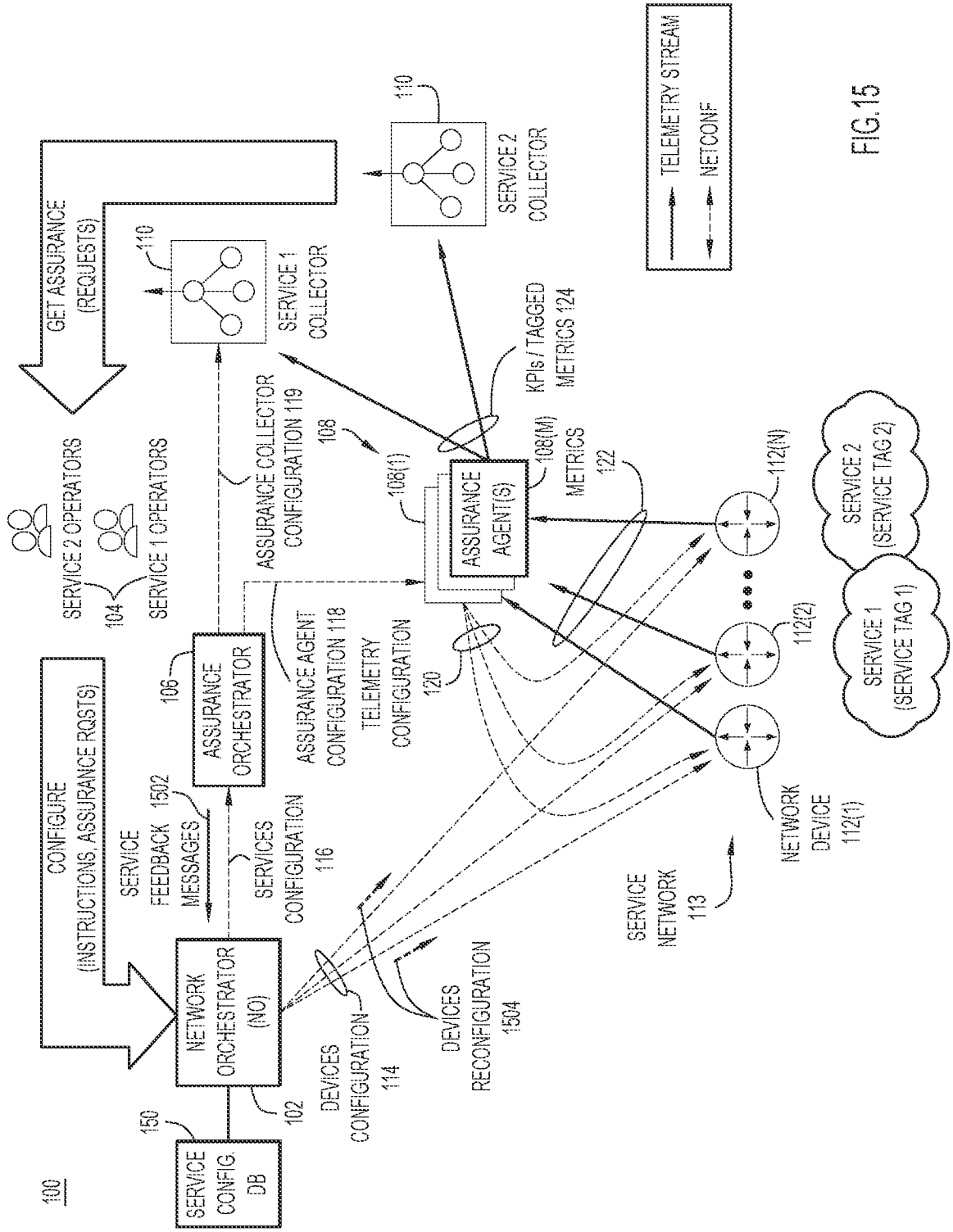
FIG. 15 is a block diagram of the service assurance system adapted to perform closed loop automation for intent-based networking, according to an example embodiment.

With reference to FIG. 15, there is shown a block diagram of service assurance system 100 adapted to perform the closed loop automation. FIG. 15 is similar to FIG. 1A, except that FIG. 15 shows additional flows used for the closed loop automation. For closed loop automation, assurance orchestrator 106 determines an overall health state of each of the services implemented on service network 113, and then provides to network orchestrator 102 service assurance messages 1502 (also referred to as "flow 1502"). Service assurance messages 1502 include the overall health states for the services as determined by assurance orchestrator 106, and may also include health states of subservices for each of the services. Service assurance messages 1502 may also include, for each of the services having an overall health state that indicates a failing (or degraded) overall health state, a corresponding request to reconfigure subservices of that service, so as to return the overall health state to a passing overall health state. The request to reconfigure may also be referred to as a "subservice reconfiguration request."

Responsive to each request to reconfigure subservices of a service received in service assurance messages 1502, network orchestrator 102 reconfigures the subservices of the service, as identified in the request. To reconfigure the subservices, network orchestrator 102 provides subservice reconfiguration information 1504 (also referred to as "flow 1504") to the network devices among network devices 112 that host/implement the subservices to be reconfigured. Subservice reconfiguration information 1504 may be formatted similarly to network device configuration information 114, and may be provided to network devices 112 similarly to the way in which the network device configuration information is provided to the network devices.

Figure 16:
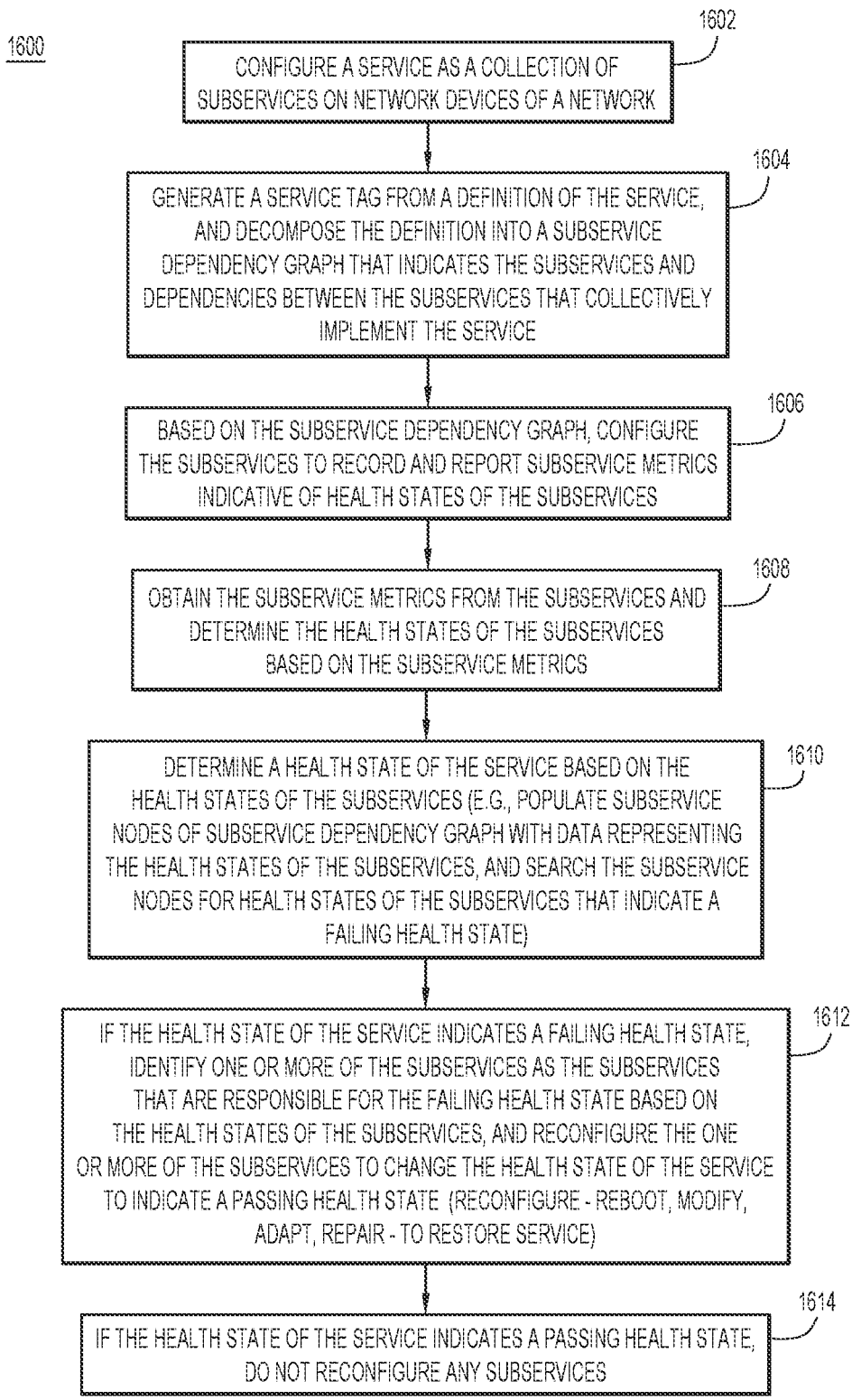
FIG. 16 is a flowchart of a method of closed loop automation for intent-based networking performed by the service assurance system of FIG. 15, according to an example embodiment.

With reference to FIG. 16, there is a flowchart of an example method 1600 of closed loop automation for intent-based networking performed in service assurance system 100, as depicted in FIG. 15, for example. Method 1600 incorporates various operations described above. The terms "health state of a subservice" and "subservice health state" are synonymous and interchangeable.

At 1602, network orchestrator 102 configures a service as a collection of subservices on network devices of a network, stores a definition of the service in service configuration database 150, and provides the definition to assurance orchestrator 106. The definition includes a service type, a service instance, and configuration information, as described above.

At 1604, assurance orchestrator 106 generates a service tag based on the definition of the service, and decomposes the definition into a subservice dependency graph that indicates the subservices and dependencies between the subservices that collectively implement the service. Operation 1604 may include operations 1402-1406 of method 1400.

At 1606, based on the subservice dependency graph, assurance orchestrator 106 and assurance agents 108, collectively, configure the subservices to record and report subservice metrics indicative of health states of the subservices. Operation 1606 may include operation 1408 of method 1400.

At 1608, assurance agents 108 and assurance orchestrator 106, collectively, obtain the subservice metrics from the subservices, tag the subservice metrics with the service tag, and determine the health states of the subservices based on the subservice metrics. Operation 1608 may include operations 1410, 1412, and 1414 of method 1400.

At 1610, assurance orchestrator 106 determines an overall health state of the service based on the health states of the subservices. In an example, assurance orchestrator 106 populates subservice nodes of the subservice dependency graph with data representing respective ones of the health states of the subservices, and searches the subservice nodes for any of the health states of the subservices that indicate a failing health state. Assurance orchestrator 106 may generate for display the subservice dependency graph populated with the data representing the health states of the subservices, as shown in FIG. 10, for example. Operation 1610 may include operation 1414 of method 1400.

At 1612, if the overall health state indicates a failing overall health state, assurance orchestrator 106 identifies one or more of the subservices as the subservices that are responsible for the failing overall health state based on the health states of the subservices. Assurance orchestrator 106 generates one or more service assurance messages that include (i) the identifier of the service (e.g., the service tag), (ii) the overall health state that indicates the failing overall health state, (iii) identifiers and health states of at least the one or more subservices that are responsible for the failing overall health state, and (iv) a request to reconfigure the one or more of the subservices. The one or more service assurance messages may report health states of all of the subservices, not just those of the one or more subservices responsible for the failing overall health state. Assurance orchestrator 106 provides the one or more service assurance messages to network orchestrator 102, as indicated in flow 1502 of FIG. 15.

Responsive to the one or more service assurance messages, including the request to reconfigure the one or more subservices, network orchestrator 102 reconfigures the one or more subservices. To do this, network orchestrator 102 (i) uses the identifier of the service and the identifiers of the one or more subservices from the one or service assurance messages as indexes to access/retrieve the subservice configuration information for the one or more subservices from the service definition stored in service configuration database 150, (ii) generates subservice reconfiguration information based on the subservice configuration information retrieved from the service definition, and (iii) provides the subservice reconfiguration information to network devices among network devices 112 that host/implement the one or more subservices, as indicated in flow 1504 of FIG. 15. In response to the subservice reconfiguration information, network devices 112 reconfigure the one or more subservices to implement the requested subservice reconfiguration, thus closing the loop for the closed loop automation process. The entire closed loop automation is performed without manual intervention.

Network orchestrator 102 may reconfigure the one or more subservices in many different ways to improve the overall health state of the service, e.g., to change the overall health state from failing to passing. In one example, network orchestrator 102 may simply repeat the operations used to configure the one or more subservices as performed at 1602, in which case the subservice reconfiguration information may include the same intent-based network device configuration objects that were used to initially configure the one or more subservices at 1602. For example, network orchestrator 102 may repeat the operations described above in connection with FIG. 1B to configure one or more of an L1 connection/interface, an L2 connection/interface, an L3 connection/interface, a packet routing protocol, ECMP, traffic shaping, and so on, as identified in the request to reconfigure.

In another example, network orchestrator 102 may reboot the one or more subservices. To reboot a subservice, network orchestrator 102 may first validate permissions and user authorizations for the subservice as provided in the service definition, force a process that implements the subservice to enter a privileged mode, and then reboot the process or an operating system that hosts the process. Alternatively, network orchestrator 102 may implement a process to perform a network device repair or link repair for critical network devices and/or links associated with the one or more subservices.

In yet another example, network orchestrator 102 may not completely reconfigure the one or more subservices, but rather may adjust/modify selected operational parameters of the one or more subservices (from their initially configured values) to improve their operational performance. This constitutes only a partial or limited reconfiguring of the one or more subservices. For example, for the one or more subservices, network orchestrator 102 may:

a. Adjust routing metrics, such as cost routing.
    b. Modify L2 QoS, MTU, or adjust storm control policies (L2).
    c. Change optical transmission power or hardcode interface speed (L1).
    d. Adjust L3 QoS or MTU (L3).

e. Change ECMP hashing inputs (e.g., use destination IP instead of source IP).

f. Perform traffic shaping by modifying QoS to assure a desired level of traffic throughput.

g. Adjust interface traffic throughput (e.g., bandwidth).

In even further examples, service assurance system 100 may reprogram the level of detail and frequency of telemetry collection per network device in order to investigate in greater detail why the overall health state of the service indicates the failing health state.

At 1614, if the overall health state indicates a passing overall health state, assurance orchestrator 106 generates one or more service assurance messages that include (i) the identifier of the service, (ii) the overall health state that indicates the passing overall health state, and (iii) identifiers and health states of the subservices. The one or more service assurance messages do not include a request to reconfigure subservices. Assurance orchestrator 106 provides the one or more service assurance messages that do not include the request to network orchestrator 102 in flow 1502. Responsive to the one or more service assurance messages that do not include the request, network orchestrator 102 does not reconfigure any subservices.

Figure 17:
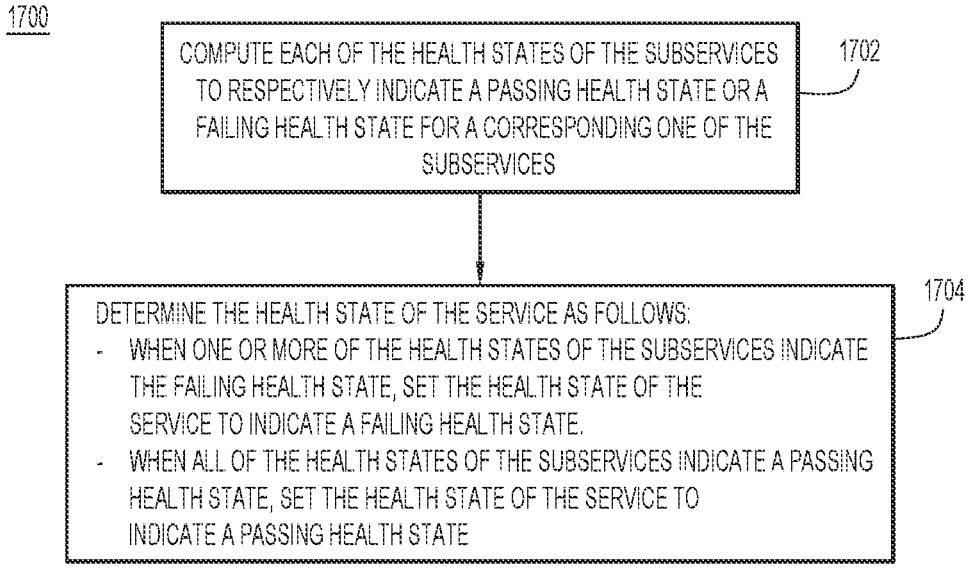
FIG. 17 shows operations expanding on an operation used to determine an overall health state of a service in the method of FIG. 16, according to an example embodiment.

With reference to FIG. 17, there are shown example operations 1700 expanding on operation 1610 used to determine the overall health state of the service in method 1600.

At 1702, assurance orchestrator 106 computes each of the health states of the subservices to respectively indicate a passing health state or a failing health state for a corresponding one of the subservices.

At 1704, assurance orchestrator 106 determines the overall health state of the service as follows:

a. When one or more of the health states of the subservices indicate the failing health state, set the overall health state of the service to indicate a failing overall health state.

b. When all of the health states of the subservices indicate a passing health state, set the overall health state of the service to indicate a passing overall health state.

Figure 18:
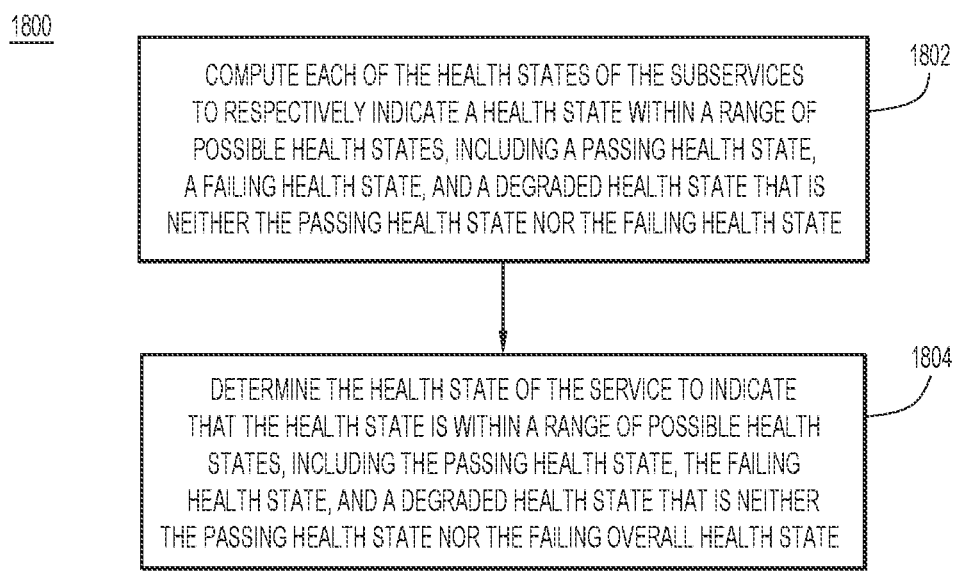
FIG. 18 shows operations expanding on the operation used to determine the overall health state of the service in the method of FIG. 16, according to an example embodiment.

With reference to FIG. 18, there are shown example operations 1800 expanding on operation 1610 used to determine the overall health state of the service in method 1600.

At 1802, compute each of the health states of the subservices, respectively, to indicate a health state within a range of possible health states, including a passing health state, a failing health state, and a degraded health state that is neither the passing health state nor the failing health state.

At 1804, determine the overall health state of the service to indicate that the overall health state is within a range of possible overall health states, including the passing overall health state, the failing overall health state, and a degraded overall health state that is neither the passing overall health state.

Figure 19:
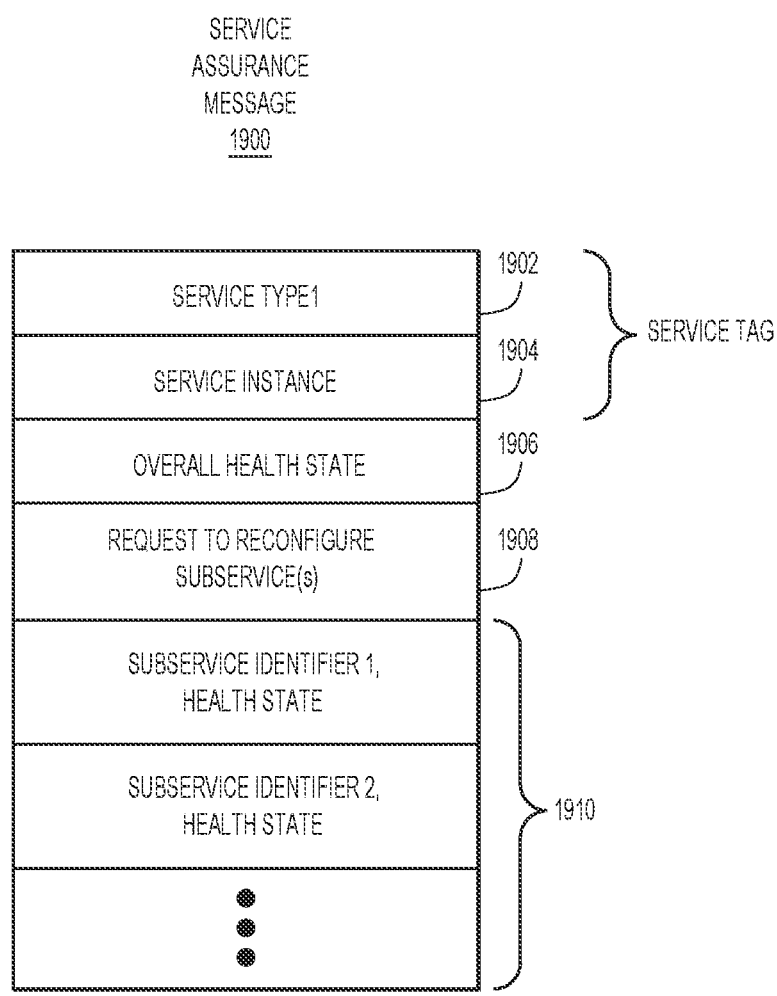
FIG. 19 is an illustration of a service assurance message used to request subservice reconfiguration in the closed loop automation for intent-based networking implemented by the service assurance system of FIG. 15, according to an example embodiment.

With reference to FIG. 19, there is an illustration of an example service assurance message 1900 that may be included in service assurance messages (flow) 1502.

Service assurance message 1900 includes a service type 1902 and a service instance 1904 that together uniquely identify a service, an overall health status 1906 of the service, a request 1908 to reconfigure one or more subservices, and identifiers and health states 1910 of the one or more services.

Intelligent Selection of Vantage Points for Assurance Monitoring of Subservices

Embodiments directed to intelligent selection of vantage points for assurance monitoring of subservices of multiple services on a network are now described in connection with FIGS. 20-25.

Broadly speaking, most network and service monitoring occurs across all lower-level network elements and service elements. This results in a deluge of data that needs to be sifted for analysis. When it comes to end-to-end user experience monitoring, one can either do a full mesh, which is expensive, or choose a sample, i.e., choose to monitor only specific segments or paths. Embodiments presented below provide an intelligent way to sample for purposes of monitoring.

In practice, service assurance system 100 may deploy and provide service assurance for a large number (e.g., hundreds or even thousands) of services on one or more networks. The services may comprise many different service types (e.g., L3VPN, and so on), and many instances of each of the different service types (e.g., L3VPN for customer 1, L3VPN for customer 2, and so on). Because each of the services includes many different subservices, the services may collectively comprise a large number (e.g., in the many thousands) of subservices. Thus, providing service assurance for such large numbers of services and their subservices presents a scaling challenge that can be met by answering questions such as which subservices should be monitored, which subservices should be monitored more closely and more aggressively than others, and how should end-to-end user experience be monitored at scale to identify subservices most likely to impact a broad range of services? Service assurance monitoring that uses intelligent selection of vantage points answers the aforementioned questions, to provide a focus for aggressive monitoring of subservices known to impact multiple services, thus reducing monitoring resource requirements.

Figure 20:
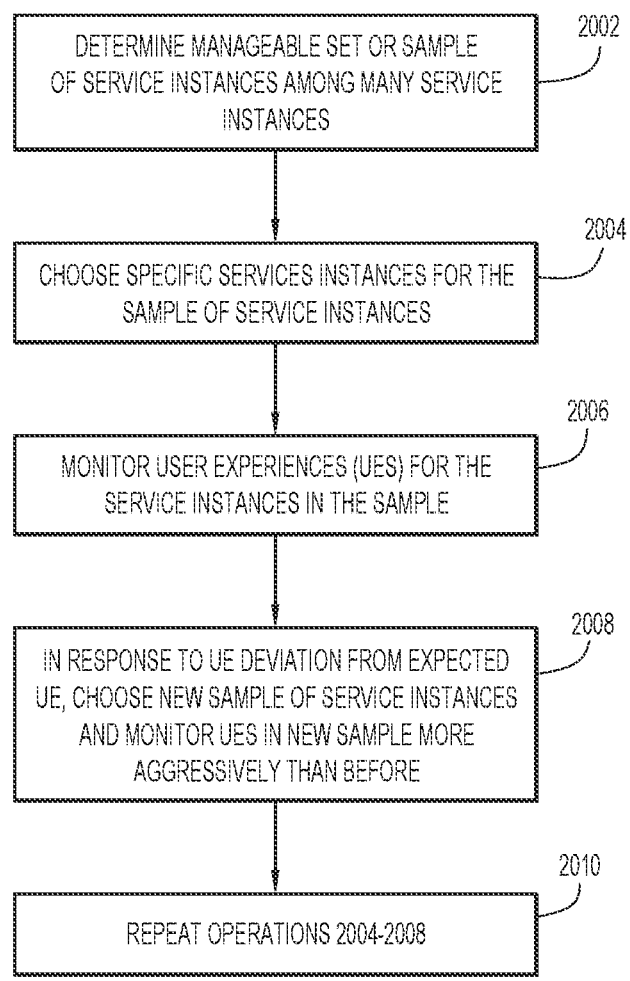
FIG. 20 is a high-level flowchart of a method of assurance monitoring of multiple services that may be performed by the service assurance system, according to an example embodiment.

With reference to FIG. 20, there is a high-level flowchart of an example method 2000 of assurance monitoring for multiple services performed by service assurance system 100. A goal of method 2000 is to choose a representative subset of service instances and/or subservices that will give a best view of the health states of a much larger number of service instances.

At 2002, service assurance system 100 determines, for a given type of service for which many service instances exist, an initial "manageable set" or initial "sample" of the service instances over which end-to-end user experience (UE) assurance monitoring may be performed. The "manageable set" or "sample" represents a fraction, e.g., 10%, of a total number of the service instances. The fraction may vary based on the total number of service instances and a size of the service provider (SP) that provides the service instances.

At 2004, service assurance system 100 chooses, from all of the service instances, specific service instances for the initial sample. One or more of the following criteria/mechanisms may be used to choose the specific service instances:

a. Choose as the specific service instances the service instances for customers that generate the most revenue.

b. Choose as the specific service instances the service instances that use the most common or shared subservices.

c. Choose as the specific service instances a random sample of the service instances.

At 2006, service assurance system 100 monitors UEs associated with the specific service instances with respect to expected UEs. Assurance system 100 may apply an initial rate to the monitoring, in which case service assurance system 100 collects or polls data (including subservice metrics, as described above) from the specific service instances at an initial rate (referred to as an initial "polling frequency"), and then determines the UEs at the initial rate based on the collected data.

When the monitoring indicates, for one of the specific services instances, a significant deviation of the UE from the expected UE, an assumption is made that the other service instances (for the given service type) are similarly affected, i.e., are experiencing significant deviations of their respective UEs from expected UEs.

At 2008, in response to the significant deviation indicated in 2006, service assurance system 100 applies a "next level down" or "deeper-dive" monitoring of the UEs, which may include choosing a new sample of service instances to monitor. The new sample may include a next tier of service instances, a random sample of service instances, and so on. Additionally, service assurance system 100 may use a higher rate (i.e., higher polling frequency) for monitoring the UEs of the service instances of the new sample, to test whether the service instances of the new sample are affected similarly to those of the initial sample.

At 2010, operations 2004, 2006, and 2008 are repeated with refinements to the sample based on where deviations in the UEs are most commonly seen.

Assurance system 100 may implement various ones of operations 2002-2008 in a way that provides advantages over conventional approaches. In particular, operation 2006 may employ subservice dependency graphs of service instances to pinpoint where the service instances intersect with one another. This enables an intelligent selection of which network paths (or segments) to monitor for UE, where the UE may be represented as a health state of a service instance in the context of a subservice dependency graph. For example, rather than performing true end-to-end monitoring from customer premises equipment (CPE)-to-CPE over a VPN, it may be equally beneficial, and more efficient, simply to monitor a single segment in the path of the VPN, if that segment is where an intersection of the subservice dependency graphs indicates an occurrence of a critical fluctuation in performance from a subservice basis. An intelligent selection of only that path segment as a monitoring point, i.e., as a "vantage point," provides considerable visibility across an entire service type (and perhaps other services, e.g., in the case of a specific leaf to spine interconnect), while limiting the consumption of resources for the UE monitoring, and limiting any negative impact on the utility of the UE monitoring.

With respect to operations 2006 and 2008, the subservice dependency graphs may also provide enhanced visibility to identify deviations in the UEs, because the subservice dependency graphs provide (overall) health states (which may be considered representative of the UEs) of the service instances represented by the subservice dependency graphs, as well as subservice health states. Therefore, if the UE monitoring determines that the performance of a service instance in the sample of service instances is outside of an acceptable range, e.g., the UE is degraded because it does not meet an acceptable threshold, the subservice dependency graph for the service instance may be examined/traversed to determine where other service instances may also be affected similarly. For example, while it may be that the CPE of every customer is faulty at the same time (e.g., due to a software bug on the CPE), it is likely that a shared subservice is unhealthy, and that the shared subservice is causing the degraded UE. The subservice dependency graph may be used to reveal other service instances that share that subservice to further identify a root cause of degradation.

Additionally, because the subservice dependency graph (i.e., the subservice nodes and the links/edges connecting the subservice nodes) may be traversed bi-directionally, from the top level (i.e., the root) down to the bottom level, and vice versa, either a top-down or a bottom-up traversal of the subservice dependency graph may be employed to find key (i.e., shared) subservices and, therefore, key service paths and service instances to monitor. For example, a top-down traversal may easily reveal that a core router is a key shared subservice vantage point, but a bottom-up traversal, that traverses services from their lower level subservice connection points to a network up to the root, may identify less obvious shared subservices. The less obvious shared subservices may include individual network device interfaces, for example, that represent bottlenecks and thus serve as excellent candidates or vantage points for UE monitoring.

Figure 21:
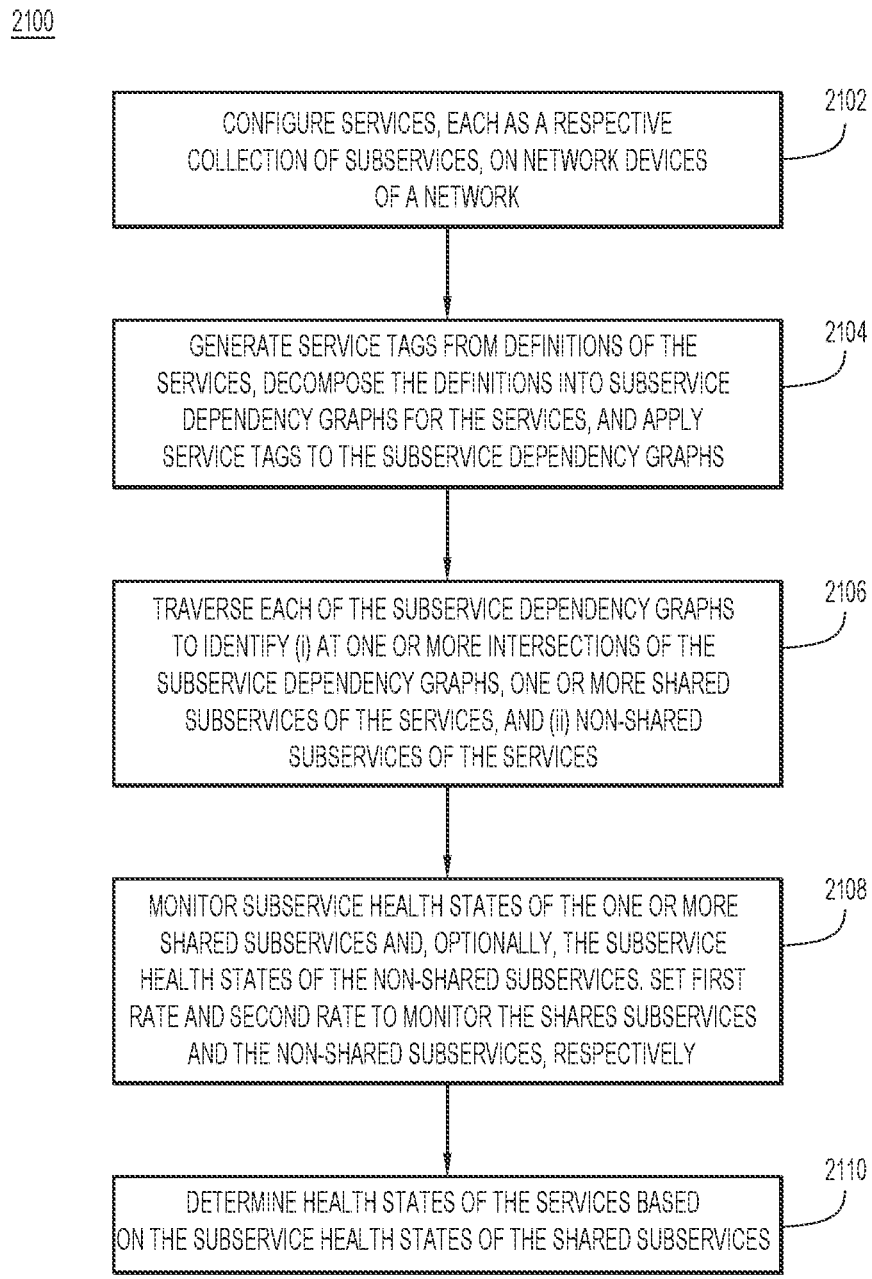
FIG. 21 is a flowchart of a method of using intelligent selection of vantage points for assurance monitoring of subservices performed by the service assurance system, according to an example embodiment.

With reference to FIG. 21, there is a flowchart of an example method of using intelligent selection of vantage points for assurance monitoring of subservices performed by service assurance system 100.

At 2102, network orchestrator 102 configures multiple services on network devices 112 of service network 113. The services each include a collection of respective subservices that implement the service. Network orchestrator 102 stores a respective definition of each of the services in service configuration database 150, and provides the definitions to assurance orchestrator 106, as described above.

At 2104, assurance orchestrator 106 generates respective service tags for the services based on the definitions of the services, as described above. Assurance orchestrator 106 also decomposes the definitions of the services into respective subservice dependency graphs (one per service) that each indicate the subservices and dependencies between the subservices that collectively implement a respective one of the services. Assurance orchestrator 106 applies the service tags to the subservice dependency graphs to associate the subservice dependency graphs with respective ones of the services to which subservice dependency graphs pertain.

At 2106, network orchestrator 106 traverses each of the subservice dependency graphs, in turn, and while traversing each subservice dependency graph, identifies and records:

a. Subservices at intersections of the subservice dependency graph with other subservice dependency graphs. Each such subservice (referred to as a "shared subservice") is a subservice that is shared by, or belongs to, at least two of the services (i.e., at least two of the subservice dependency graphs). That is, each shared subservice has links or edges that lead to at least one other service. Depending on the number of intersections between the subservice dependency graph and other subservice dependency graphs, the traversal may identify zero, one, or more than one shared subservice. Shared subservices are marked as vantage points for assurance monitoring because they each impact health states of more than one of the services.

b. Non-shared subservices in the subservice dependency graph that are not shared by any other services (i.e., by other subservice dependency graphs).

More specifically, traversal includes a traversal of all of the subservice nodes, and the links between the subservice nodes, of the subservice dependency graph. The subservice identifiers stored in the subservice nodes that are traversed are recorded and compared against the subservice identifiers previously recorded during traversals of other subservice dependency graphs. Thus, a match between subservice identifiers indicates that the subservice identified by the matched subservice identifiers belongs to different services, i.e., that the subservice is a shared subservice. Conversely, subservice identifiers that remain unmatched after traversal of all of the subservice dependency graphs identify non-shared subservices.

Other statistics may be recorded and/or determined at operation 2106. For example, network orchestrator 106 may determine, for each of the shared subservices, a respective number of services that share the shared subservice. Network orchestrator 106 may then determine, based on those numbers, a most shared subservice (i.e., the shared subservice that is shared by the greatest number of services). Network orchestrator 106 may use such statistics to make subsequent assurance monitoring decisions, such as, which subservices should be monitored most aggressively, which subservices may not need to be monitored, and so on.

At 2108, assuming one or more shared subservices, service assurance system 100 monitors/determines subservice health states of at least the one or more shared subservices, i.e., the vantage points, while they are operating. Operations used to implement the monitoring of subservices (i.e., expanding on operation 2108) are described below in connection with FIG. 22. In one embodiment, assurance orchestrator 106 monitors the subservice health states of each of the one or more shared subservice, but does not monitor subservice health states of the non-shared subservices. This embodiment may be further limited such that assurance orchestrator 106 monitors the subservice health state of only the most shared subservice, and no other subservices. In another embodiment, assurance orchestrator 106 monitors the health state of the most shared subservice at a first rate, and monitors the health states of remaining ones of the one or more shared subservices that are not the most shared subservice at a second rate that is greater than the first rate. In yet another embodiment, assurance orchestrator 106 monitors the subservice health states of the one or more shared subservices, and additionally monitors subservice health states of the non-shared subservices while they are operating.

Assurance system 100 may set one or more rates at which to monitor the subservice health states. For example, service assurance system 100 sets a first rate at which to monitor the subservice health states of the shared subservices (and then monitors those subservice health states at the first rate), and a second rate at which to monitor the subservice health states of the non-shared subservices (and then monitors those subservice health states at the second rate). In one embodiment, the first rate and the second rate are the same. In another embodiment, the first rate is greater than the second rate, such that service assurance system 100 monitors the subservice health states of the shared subservices more frequently than the service assurance system monitors the subservice health states of the non-shared subservices.

At 2110, service assurance system determines health states of the services based on the subservice health states as monitored in operation 2108, e.g., based on the subservice health states of the shared subservices, and optionally the subservice health states of the non-shared subservices. Assurance orchestrator 106 determines the health states at whichever of the rates at which the subservice health states are monitored.

Figure 22:
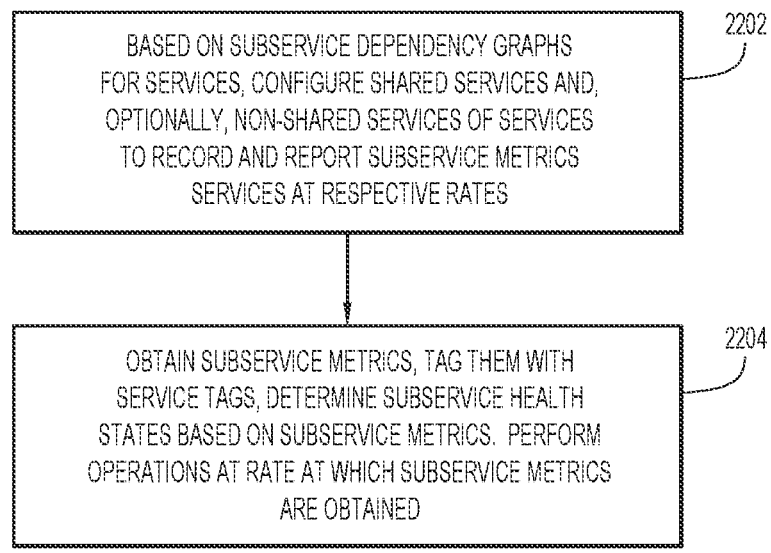
FIG. 22 shows operations expanding on an operation of the method of FIG. 21 used to monitor subservice health states, according to an example embodiment.

With reference to FIG. 22, there are shown operations 2200 expanding on operation 2108 of method 2100 used to monitor subservice health states. Operations 2200 include various operations of method 1400 described above in connection with FIG. 14.

At 2202, based on the subservice dependency graphs, assurance orchestrator 106 and assurance agents 108, collectively, configure the shared subservices and, optionally, the non-shared subservices of the services, to record and report subservice metrics indicative of health states of the subservices of the services at respective rates (e.g., the first rate and/or the second rate). Operation 2202 commands the subservices to record and report their respective subservice metrics at the respective rates via telemetry configuration information 120, e.g., each monitoring object 1200 may include a rate field that defines a rate, as a multi-bit word, at which subservice metrics are to be recorded and reported. The rate may be in a range from 0.01 Hz to 1000 Hz, for example, although lower and higher rates are possible. Operation 2202 may include operation 1408 of method 1400. As a result of operation 2202, the subservices of the services record and report their respective subservice metrics at the respective rates.

At 2204, assurance agents 108 and assurance orchestrator 106, collectively, (i) obtain the subservice metrics from the shared subservices and, optionally, the non-shared subservices, at the respective rates, (ii) tag the subservice metrics with the service tags corresponding to the services to which the subservice metrics pertain, and (iii) determine the subservice health states of the subservices based on the subservice metrics. Operation 2204 may include operations 1410, 1412, and 1414 of method 1400. The obtain operation, the tag operation, and determine subservice health state operation may each be performed at the respective rates at which the service metrics are reported by the subservices, so that the subservice health states are determined at those rates.

Figure 23:
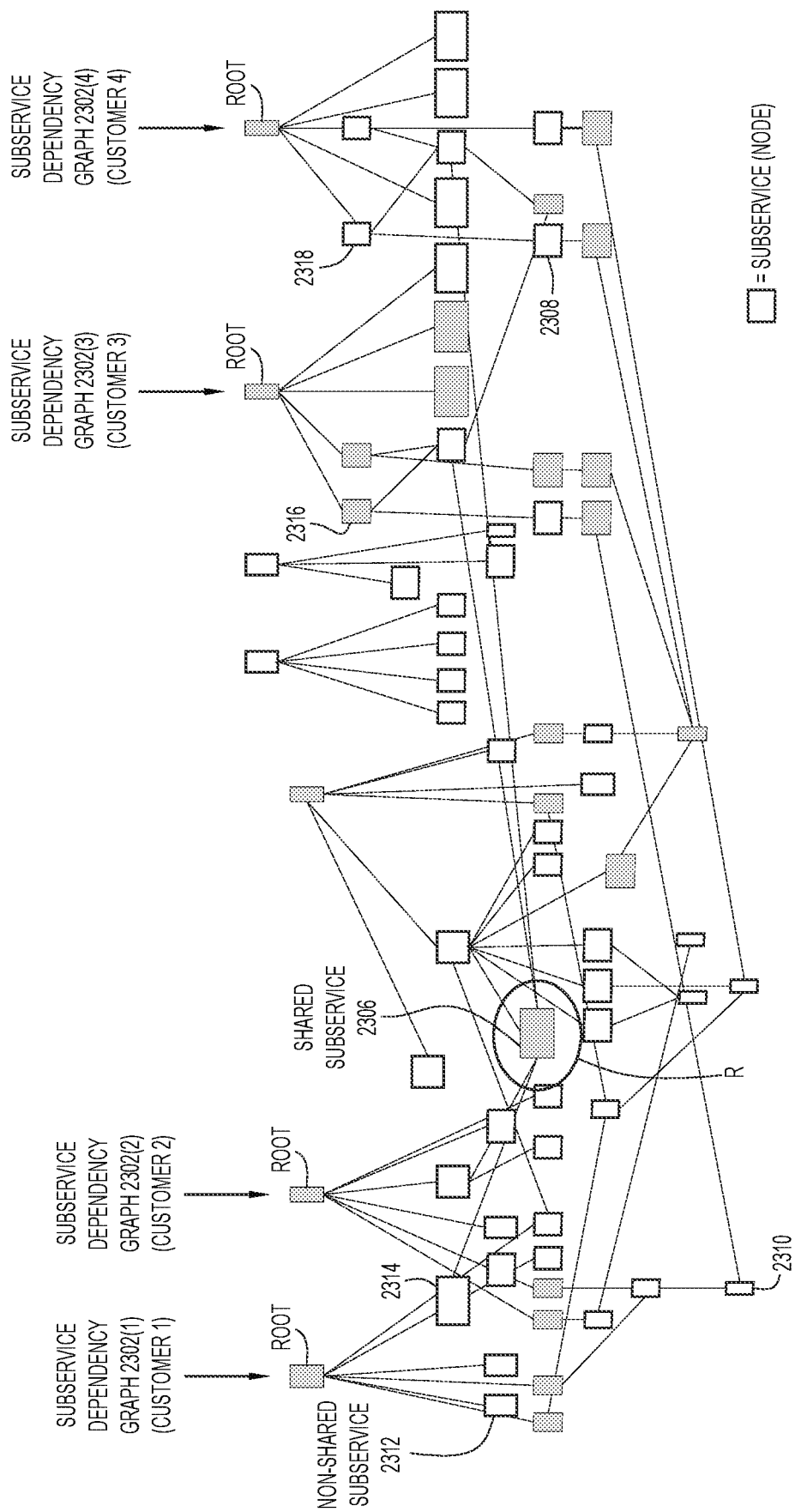
FIG. 23 is an illustration of assurance monitoring using intelligent selection of vantage points, performed by the service assurance system on a collection of service instances configured on a service provider network, according to an example embodiment.

An example application of assurance monitoring of four service instances configured on a network is now described in connection with FIGS. 23 and 24. With reference to FIG. 23, there is an illustration of an example of assurance monitoring using intelligent selection of vantage points performed by service assurance system 100 on a collection of service instances configured on a network. In the example of FIG. 23, at an initial stage of assurance monitoring, service assurance system 100 decomposes the collection of service instances into intersecting subservice dependency graphs 2302(1), 2302(2), 2302(3), and 2302(4) (collectively referred to as subservice dependency graphs 2302) for four VPN tunnel instances of a service type=L3VPN for four customers, including Customer 1, Customer 2, Customer 3, and Customer 4, respectively. The interconnected blocks shown in FIG. 23 are subservice nodes that represent respective subservices, except for the root node blocks, which identify the specific service instances. The subservice nodes of subservice dependency graphs 2302 may each include subservice information similar to the subservice information included in various one of the subservice nodes of subservice dependency graph 600, as shown in FIG. 6, but such subservice information is not shown in the subservice nodes of the subservice dependency graphs 2302 to avoid cluttering FIG. 23. The terms "subservices" and "subservice nodes" may be used synonymously and interchangeably when referencing any given subservice dependency graph.

At the initial stage of assurance monitoring, service assurance system 100 traverses subservice dependency graphs 2302 to (i) identify/reveal shared subservices (subservice nodes) 2306, 2308, and 2310, among others, at intersections of the subservice dependency graphs, and (ii) non-shared subservices (subservice nodes) 2312, 2314, 2316, and 2318, among others. Many of the shared and non-shared subservices are not labeled in FIG. 23 for purposes of illustrative clarity, and to avoid confusion. In addition, the traversal determines that shared subservice 2306, shared by all four of the service instances represented by subservice dependency graphs 2302, is a most shared subservice among the shared subservices.

Assurance system 100 performs an end-to-end assurance monitoring assessment, which determines (i) subservice health states of most of the subservices of the service instances represented by the subservice dependency graphs 2302, and (ii) health states of all of the service instances based on the subservice health states. In FIG. 23, shaded blocks indicate failed or degraded subservice health states/health states of service instances, while un-shaded blocks indicate passing or non-degraded subservice health states/health states of service instances. Accordingly, some of the subservice health states and some of the health states of the service instances are failing or degraded.

Shared subservice 2306 represents, and is selected as, a vantage point for subsequent assurance monitoring because a subservice health state of that one subservice potentially impacts overall health states of all of four of the service instances represented by the subservice dependency graphs 2302. Accordingly, after the initial (end-to-end) assurance monitoring, in a subsequent stage of assurance monitoring, service assurance system 100 may monitor the subservice health state of shared subservice 2306 more aggressively than before (i.e., more aggressively than at the initial stage), and more aggressively than any other subservices. For example, service assurance system 100 may drill-down, specifically on shared subservice 2306, by soliciting additional subservice metrics from the shared subservice and/or monitoring its subservice health status more frequently than before.

Figure 24:
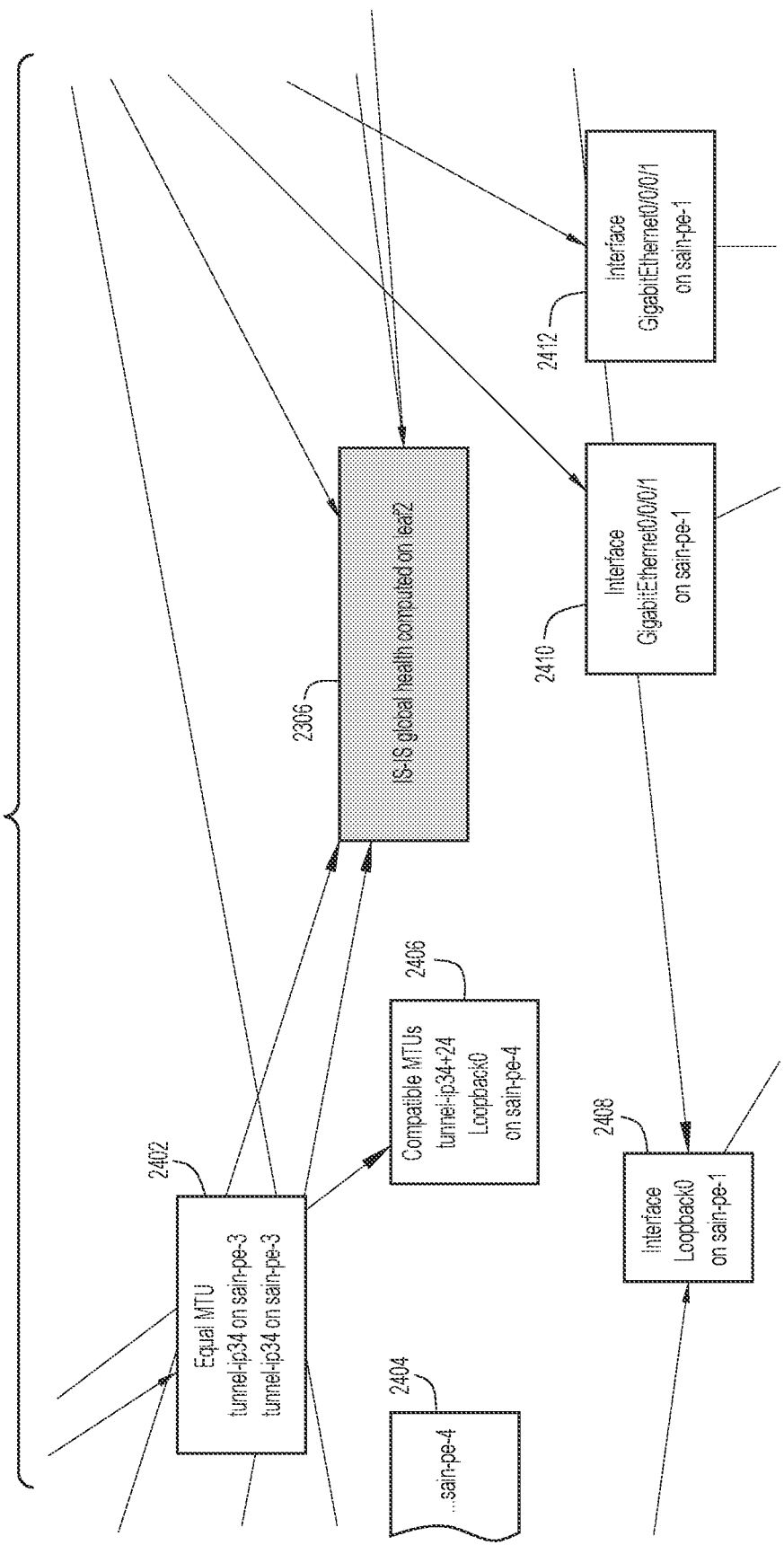
FIG. 24 is an illustration of a drill-down view of a vantage point shown in FIG. 23, according to an example embodiment.

With reference to FIG. 24, there is an illustration of a drill-down view of the vantage point represented by shared subservice 2306 in region R of FIG. 23. As shown in FIG. 24, shared subservice 2306 is an IS-IS subservice implemented on a leaf node ("leaf2") of a spine switch. Shared subservice 2306 is shown adjacent to additional subservices 2402-2412. The subsequent, more aggressive, assurance monitoring may increase the rate at which the subservice health state of the IS-IS subservice is monitored, and may collect additional information from the IS-IS subservice, and thus ensure proper functionality of the IS-IS subservice.

Figure 25:
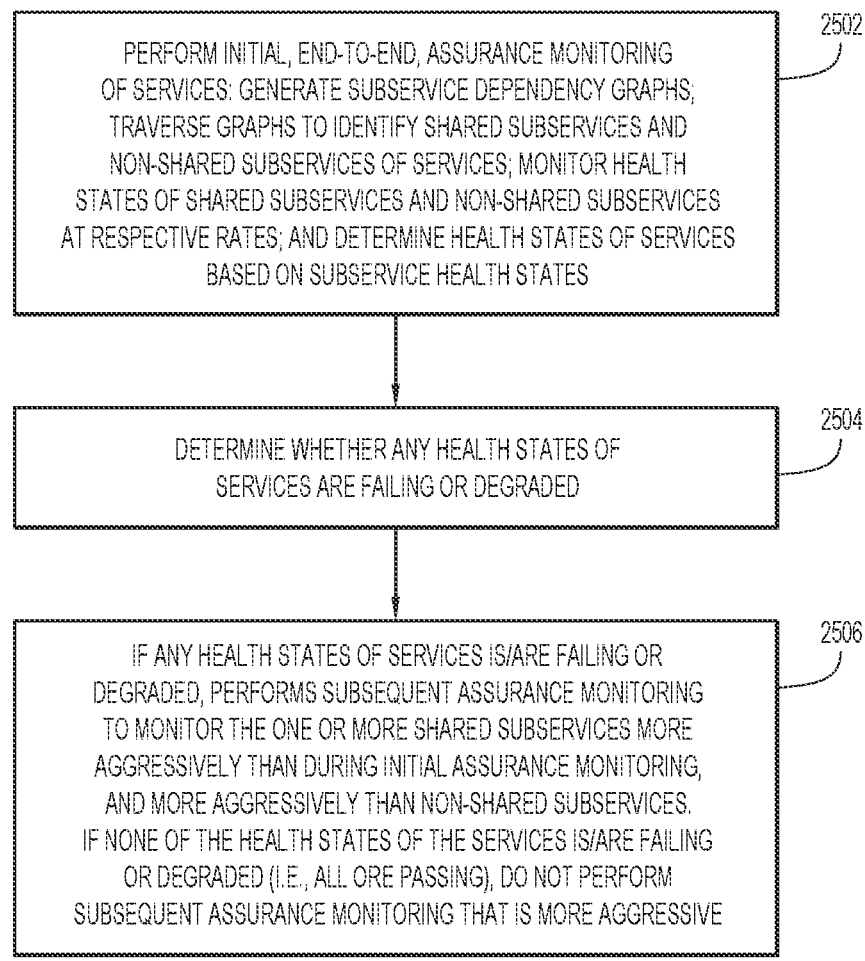
FIG. 25 is a high-level flowchart of a method of performing assurance monitoring using intelligent selection of vantage points that includes operations from the methods associated with FIGS. 21-24, according to an example embodiment.

With reference to FIG. 25, there is a high-level flowchart of an example method 2500 of performing assurance monitoring using intelligent selection of vantage points that includes and combines various operations described above in connection with FIGS. 21-24.

At 2502, service assurance system 100 performs an initial, end-to-end, assurance monitoring (e.g., stage 1 assurance monitoring) of services configured on network devices of a network. The services may include multiple service instances of a same service type, different service types, or both. The initial end-to-end assurance monitoring includes operations to:
  a. Generate subservice dependency graphs representative of the services.
  b. Traverse the subservice dependency graphs to identify one or more shared subservices at intersection points of the subservice dependency graphs, and to identify non-shared subservices. Method 2500 assumes there is at least one shared subservice.
  c. Using the subservice dependency graphs, monitor subservice health states of the one or more shared subservices and the non-shared subservices at a first rate and a second rate, respectively. The first rate and the second rate may be the same, or the first rate may be greater than the second rate.
  d. Determine health states of the services based on the subservice health states.

At 2504, service assurance system 100 determines whether any of the health states of the services are failing or degraded, as described above in connection with FIG. 16, for example.

At 2506, when/if it is determined that any of the health states of the services is/are failing or degraded, service assurance system 100 performs subsequent assurance monitoring (e.g., stage 2 assurance monitoring) that monitors the one or more shared subservices more aggressively than during the initial, end-to-end, assurance monitoring, and more aggressively than the non-shared subservices. For example, service assurance system 100 monitors the subservice health states of the one or more shared subservices at the first rate, such that the first rate is greater than the second rate, and collects additional information/subservice metrics from the one or more shared subservices. In another example, assurance system 100 may increase the first rate to an even higher rate, and monitor the one or more shared services at the increased rate. In one embodiment, service assurance system 100 continues to monitor the subservice health states of the non-shared subservices of the services at the second rate. In another embodiment, the subsequent assurance monitoring ceases to monitor the subservice health states of the non-shared subservices. Thus, the subsequent assurance monitoring is more aggressive and more focused than the initial, end-to-end, assurance monitoring.

If none of the health states of the services is/are failing or degraded, service assurance system 100 does not perform the subsequent, more aggressive, more focused, assurance monitoring.

Applying Baselining to Service-Tagged Data from Subservices

In the embodiments presented above, SAIN agents 108 collect subservice metrics from subservices of a service based on a decomposition of the service into the subservices via a subservice dependency graph, and tag the subservices metrics with (i.e., add to the subservice metrics) a distinct service tag that identifies the service. SAIN orchestrator 106 correlates the tagged subservice metrics to the service based on the tag, determines subservice performance (i.e., health) of the subservices and service performance (i.e., health) of the service based on the tagged metrics, and presents the subservice health and the service health on the subservice dependency graph, annotated to reflect the subservice health and the service health. Therefore, the annotated subservice dependency graph represents a construct by which the subservice health and the service health may be visualized. Specifically, the subservice dependency graph highlights whether the subservices are healthy or unhealthy (i.e., degraded), and whether the service is healthy or unhealthy.

When the service operates over an extended period of time, SAIN agents 108 repeatedly collect and tag subservice metrics, and SAIN orchestrator 106 repeatedly derives and presents the subservice health and the service health based on the subservice metrics. The resulting subservice health and/or service health, as visualized, may oscillate between healthy and unhealthy/degraded. Thus, a service administrator or operator presented with such oscillations is faced with determining whether the oscillations represent either (i) normal operation of the subservices and/or the service, in which case no corrective action should be taken at either a subservice-level or a service-level, or (ii) abnormal (i.e., degraded) operation of the subservices and/or the service in a way that negatively impacts a user experience for the service, in which case corrective action should be taken at the service-level and/or the subservice level to return the user experience to normal. In other words, in the context of service assurance monitoring, the service administrator is faced with determining whether the oscillations represent background noise for which no corrective action should be taken, or a subservice/service problem that has a negative impact on the user experience and that should be remedied through the corrective action.

Figure 26:
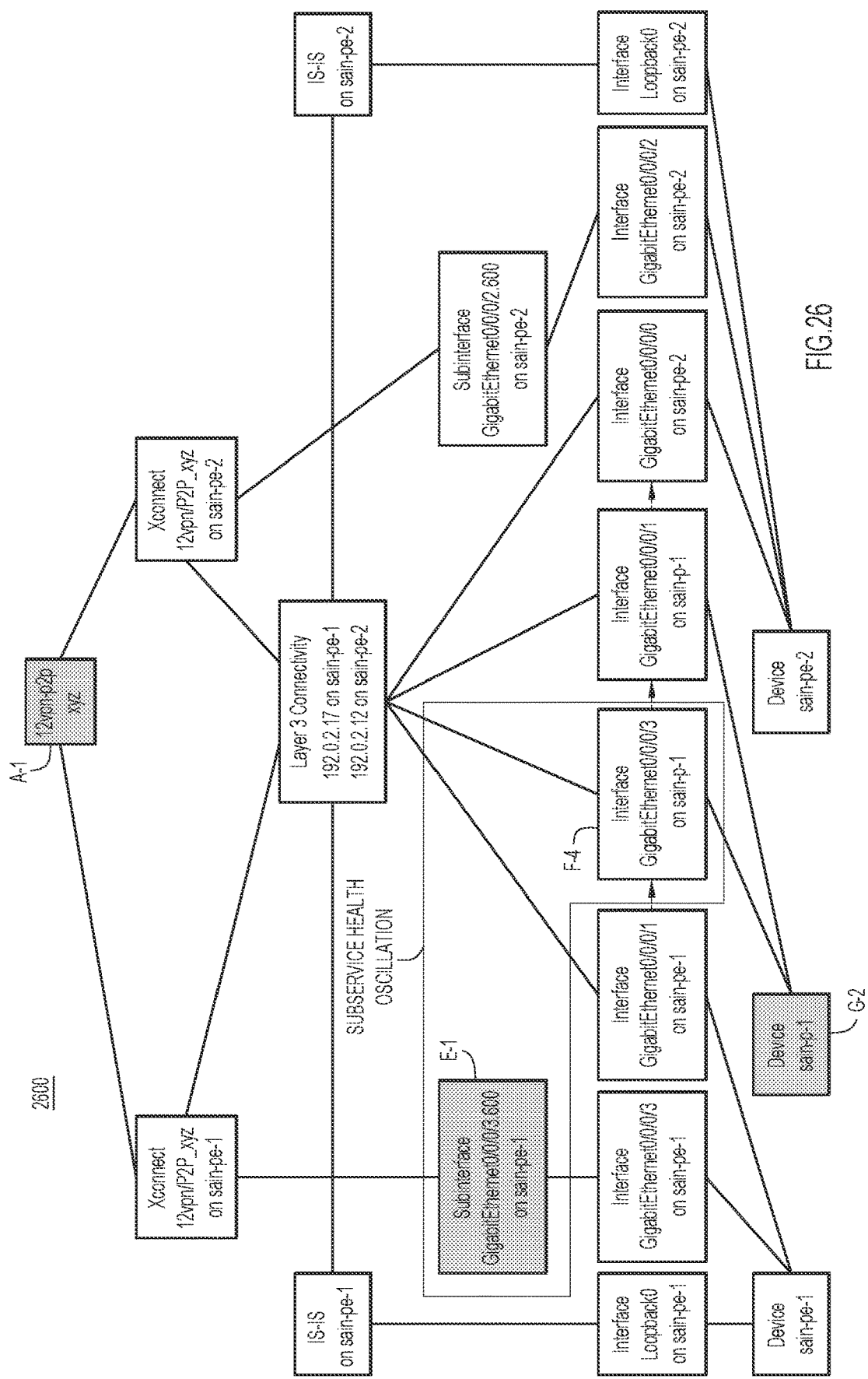
FIG. 26 is an illustration of a subservice dependency graph, similar to the subservice dependency graph of FIG. 6, useful for describing service and/or subservice health oscillations, according to an example embodiment.

A visual example of service/subservice health oscillations that may occur during service assurance monitoring in assurance system 100 is now described with reference to the subservice dependency graphs depicted in FIGS. 6 and 10, and also with reference to a subservice dependency graph depicted in FIG. 26. FIG. 26 is an illustration of a subservice dependency graph 2600 similar to subservice graph 600 of FIG. 6, except for differences described below. For purposes of the visual example, the subservice dependency graphs of FIGS. 6, 10, and 26 represent respective decompositions of the same service into subservices, and depict subservice health and service health at successive times over a time period. On each of the subservice dependency graphs, an unshaded block indicates a healthy subservice/service, and a shaded block indicates an unhealthy subservice/service. For the visual example, it is assumed that the service is operating and assurance system 100 is live. That is, while the service is operating, assurance system 100 repeatedly: collects and tags subservice metrics from the subservices; updates subservice health and service health based on the tagged subservice metrics; and presents the subservice dependency graph for the service, annotated with the updates in health, i.e., presents time-ordered subservice dependency graphs with subservice and service health updates.

At a first time, subservice dependency graph 600 represents that all of the subservices are healthy and service is healthy, based on a first set of subservice metrics collected at or near the first time. At a second time following the first time, e.g., by a few seconds, an updated subservice dependency graph depicted in FIG. 10 represents that only subservices E1, F4, and G2 are unhealthy and the service is unhealthy, based on a second set of subservice metrics collected at or near the second time. At a third time following the second time, e.g., by a few seconds or a minute, updated subservice dependency graph 2600 represents that only subservices E1 and G2 are unhealthy and the service is unhealthy, based on a third set of subservice metrics collected at or near the third time. Thus, scanning across the time-ordered subservice dependency graphs of FIGS. 6, 10, and 26, subservice F-4 oscillates from healthy, to unhealthy, and then back to healthy at the first time, the second time, and the third time, while the service (designated at A-1) transitions from healthy to unhealthy. At some later time, the service may transition back to healthy, thus giving rise to another oscillation at the service-level.

Generally, the oscillations may result from a number of varying conditions of the service, such as changes in a distribution of user traffic (i.e., data packets) carried by the service, variations in a throughput of the user traffic, changes to routing of the user traffic, and so on. Some of the conditions of the service, and oscillations associated with the conditions, may be critical to operations of the user of the service. Other conditions and their oscillations may be useful to a service administrator for troubleshooting the service. On the other hand, some of the conditions and their oscillations may simply represent "noise" that occurs during typical ebb-and-flow associated with network operation. From the perspective of service assurance, the different possibilities that give rise to oscillations make it difficult to determine which oscillations have a measurable negative impact on the service and/or users of the service and should, therefore, be reduced or eliminated, and which oscillations do not have a measurable negative impact on the service.

Accordingly, embodiments presented below provide techniques to (i) "baseline" the operation of the subservices of the service and, once the baseline has been established, (ii) use the baseline to identify which oscillations in subservice metrics from the subservices lead to problematic impacts to the service and/or the user experience for the service. In other words, the embodiments include a baseline process (i.e., "baselining") to establish a baseline for the subservices, and a monitoring process (i.e., "monitoring") following the baseline process to monitor the subservices against or based on the baseline.

Before the baseline process can begin, the service should be in a "steady state." This means there are no known service-impacting or user-impacting issues or problems. The terms "user-impacting" and "service-impacting" refer to negative (i.e., undesirable) impacts to the service and negative impacts to the user experience. Whether the service is in the steady state may be programmatically determined using a standard issue/ticket tracking mechanism for the service; if there are no operationally impacting tickets open, and there is an assumption that that use of the service is normal (e.g., from a time of year/day perspective), then the baseline process can begin. Once the baseline process has begun, during the baseline process, a new ticket that indicates a service-impacting problem resets the baseline process.

The baseline process may include the following operations:
   a. Learn "normal" parameters of subservice health using heuristic expressions from heuristic packages and various subservice metrics, e.g., from KPIs derived from the subservice metrics.
   b. Discover a network topology of the service relative to network devices directly affecting the service. Map both control and dataplane topology views to one another and to subservices of the service.
   c. Observe and record (obtain) normal values for health of each of the subservices (e.g., memory available, CPU utilization, temperature of network device, performance management indicators, and the like).
   d. Identify interface and user traffic parameters.
   e. Repeat (a)-(d) for subservice health of all subservices relative to the service.

The baseline process repeats various ones of operations (a)-(d) to determine (i) a respective optimum rate or frequency at which to obtain/collect subservice metrics from each of the subservices, and (ii) a respective confidence interval for each of the subservice metrics. To determine the optimum rate, the baseline process monitors subservice metrics to identify typical oscillations in subservice flow (e.g., moves between night/day weekday/weekend) and subservice health (e.g., moves between healthy and unhealthy (i.e., degraded)) that correlate with the optimum rate. To identify the oscillations, the baseline process repeatedly varies (e.g., decreases) the rate at which subservice metrics are collected, while searching for an oscillation pattern in the collected subservice metrics. The optimum rate is the rate at which the oscillation pattern just begins to appear. Occurrence of the oscillation pattern indicates that a maximum granularity of information conveyed by the subservice metric has been reached, such that a further decrease in the rate does not provide further insight into subservice health, and may even skew a perception of subservice/service operation.

To determine the confidence interval, the baseline process collects subservice metrics, generates statistics from the metrics, including a probability distribution of values of the subservice metrics, and then determines the confidence interval from the statistics. The confidence interval for each subservice metric indicates what is deemed "normal" for the subservice metric. That is, values of the subservice metric that fall within the confidence interval are deemed "normal" and values of the subservice metric that do not fall within the subservice metric, i.e., are outside of the confidence interval, are deemed anomalous or abnormal.

Once the baseline process has baselined each of the subservices, i.e., established a respective optimum rate and a respective confidence interval for subservice metrics from each of the subservices, a monitor process (also referred to as the "deviation monitor mode") begins. In other words, assurance system 100 transitions from the baseline process to the monitor process. The monitor process collects from each of the subservices respective subservice metric(s) at the respective optimum rate and compares the subservices metric(s) against the respective confidence interval, especially looking for a deviation of the subservice metric(s) outside of the confidence interval.

Initially, the monitor process considers a deviation of the subservice metric(s) outside of the confidence interval (i.e., outside of what is considered "normal" in the baseline process); however, because not all such deviations may be service-impacting, the monitor process does not assume that the deviation is service-impacting. Rather, the monitor process performs user experience tests (e.g., IP SLA operations)) at the service-level to determine whether the deviation is actually service-impacting. User experience tests may inject user traffic through the service, or simulate the user traffic in the network, and test service-level performance associated with the user traffic.

If results of the user experience tests indicate that the deviation has not caused a service-impacting problem, i.e. the deviation is not service-impacting, the monitor process takes one or more actions to "learn" that the deviation, while outside of the confidence interval, is actually normal. For example, the monitor process may expand the confidence interval to accommodate the deviation, so that a similar deviation resulting from subsequently collected subservice metrics is no longer outside of the confidence interval. Also, the monitor process may record the deviation to help identify compound issues for root-cause isolation of the issues. The aforementioned operations of the monitor process repeat until a threshold of unacceptable user experience is reached; that threshold may be used to determine service health.

On the other hand, if the results of the user experience tests indicate that the deviation is service-impacting, one or more actions may be taken at the subservice-level and/or the service level to remedy the problem that caused the deviation, thus avoiding a subsequent service-impacting deviation; however, the confidence interval is not adjusted because it accurately reflects actual normal performance.

Figure 27:
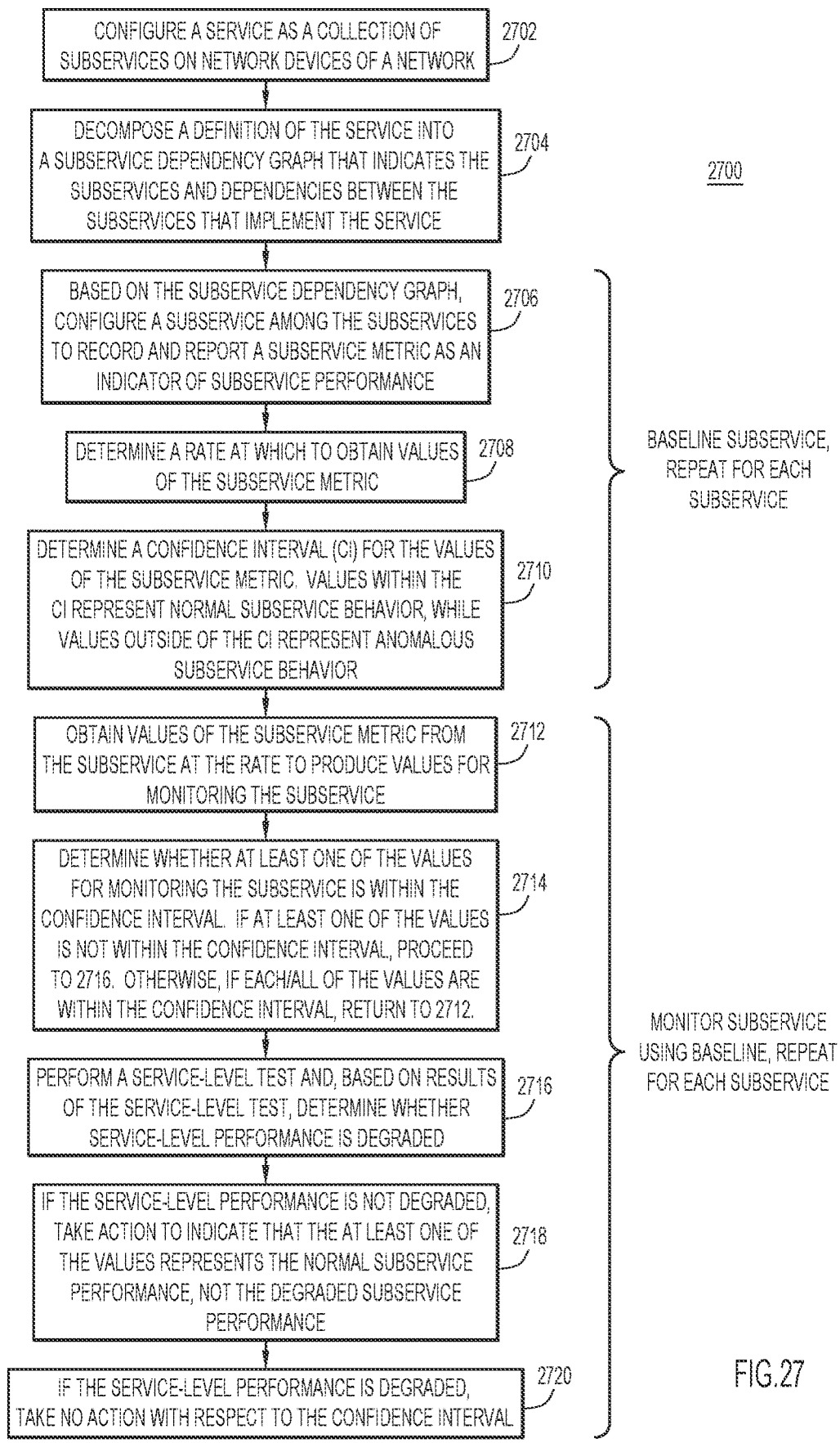
FIG. 27 is a flowchart of a method of baselining subservices of a service and then performing assurance monitoring of the service based on results of the baselining, according to an example embodiment.

With reference to FIG. 27, there is a flowchart of an example method 2700 of baselining subservices of a service and then monitoring the service based on results of the baselining. Operations of method 2700 are performed by one or more of the components of assurance system 100, including assurance agents 108 and assurance orchestrator 106, as indicated below by way of example, only.

At 2702, network orchestrator 102 configures a service as a collection of subservices on network devices of a network, and provides the definition to assurance orchestrator 106. The definition includes a service type, a service instance, and configuration information, as described above.

Next operations 2704-2710 collectively represent operations for baselining a subservice, and are repeated for each of the subservices to establish baselines for all of the subservices.

At 2704, assurance orchestrator 106 generates a service tag based on the definition of the service, and decomposes the definition into a subservice dependency graph that indicates the subservices and dependencies between the subservices that collectively implement the service. Operation 2704 may include operations 1402-1406 of method 1400.

At 2706, based on the subservice dependency graph, assurance orchestrator 106 and assurance agents 108, collectively, configure the subservices to record and report subservice metrics indicative of health states of the subservices. Operation 2706 may include operation 1408 of method 1400, and operation 2202 of method 2200.

At 2708, assurance agents 108 and/or assurance orchestrator 106 determine a rate at which to obtain values of the subservice metric. This is the "optimum rate" discussed above. Example operations used to determine the rate are described below in connection with FIG. 29.

At 2710, assurance agents 108 and/or assurance orchestrator 106 determine a confidence interval for the values of the subservice metric. The confidence interval is configured such that values of the subservice metric within or not within the confidence interval are assumed to indicate normal subservice performance or unhealthy/degraded subservice performance, respectively. Example operations used to determine the confidence interval are described below in connection with FIGS. 30 and 31.

After operation 2710, method 2700 transitions to next operations 2712-2720, which collectively represent operations for monitoring the subservice and the service using results from the baselining operations, i.e., using baselining results.

At 2712, assurance agents 108 obtain/collect values of the subservice metric from the subservice at the rate determined at 2710 to produce values for monitoring the subservice, tag the values of the subservice metric with the service tag, and determine KPIs, if any, based on the subservice metrics and any heuristic packages derived from the subservice dependency graph, as described above. Operation 2712 may include features of operations 1410, 1412, and 1414 of method 1400, and operations 2202 and 2204 of method 2200.

At 2714, assurance agents 108/assurance collector 106 determine whether at least one of the values for monitoring the subservice is within the confidence interval. If at least one of the values (e.g., two successive values) is not within the confidence interval, and thus represents a deviation outside of the confidence interval, flow proceeds to 2716. Otherwise, if each of the values is within the confidence interval (i.e., all of the values are within the confidence interval), flow returns to 2712.

At 2716, assurance collector 106 performs a service-level test (i.e., not a subservice-only test) indicative of user experience and, based on results of the service-level test, determines whether service-level performance is degraded as a result of the deviation of the at least one of the values outside of the confidence interval. Example operations used to perform the service-level test, and determine whether the service-level performance is degraded, are described below in connection with FIG. 28.

At 2718, if the results of the service-level test indicate that the service-level performance is not degraded, action is taken to indicate that the at least one of the values represents the normal subservice performance, not the degraded subservice performance, even though the at least one of the values is outside of the confidence interval. In one example, the action may include expanding/increasing the confidence interval sufficiently to encompass the at least one of the values, to produce an expanded confidence interval. Thus, subsequent values of the subservice metric collected from the subservice that are equal to the at least one of the values will be within the expanded confidence interval. Also, the at least one of the values may be recorded and flagged as being outside of the initial (unadjusted) confidence interval, for subsequent service issue analysis.

An example of when the subservice metric may include values outside of the confidence interval that do not represent degraded service-level performance is when the subservice metric measures traffic throughput on a network device interface compared against a confidence interval established when the traffic throughput was relatively low. At a later time when the interface experiences a large increase in traffic throughput that does not actually saturate the interface, the large increase may deviate outside of the confidence interval; however, the deviation does not indicate actually degraded service-level performance because the interface is not saturated.

At 2720, if the service-level performance is degraded, no action is taken with respect to the confidence interval because the confidence interval correctly captured anomalous subservice behavior, i.e., the deviation of the subservice metric outside of the confidence interval was service-impacting, as indicated by the service-level test.

Method 2700 repeats operations 2706-2720 for each of the subservices of the subservice, to (i) produce respective rates for collecting respective subservice metrics from the subservices and respective confidence intervals for the subservice metrics from the subservices, (ii) monitor subservice metrics collected from the subservices with respect to their respective confidence intervals, and (iii) take action with respect to the respective confidence intervals, as described above.

Figure 28:
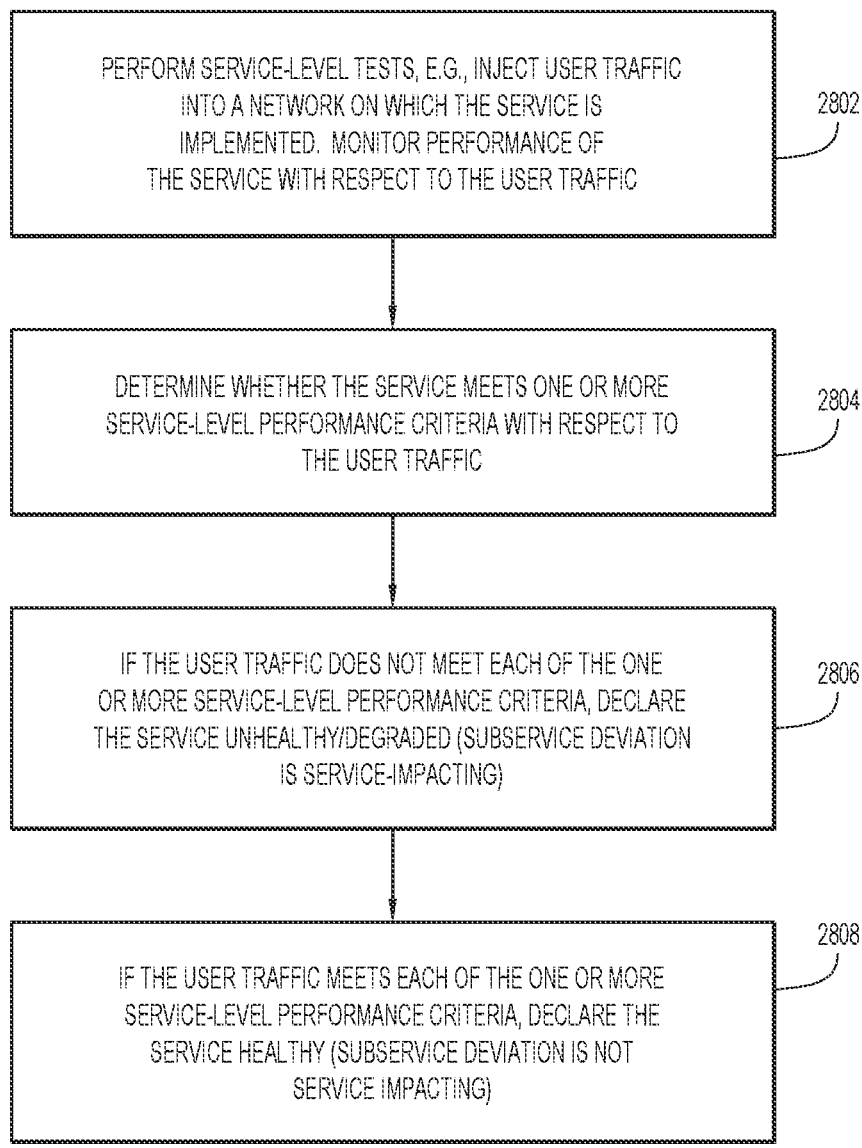
FIG. 28 shows operations expanding on an operation of the method of FIG. 27 used to determine whether service-level performance of a service is degraded, according to an example embodiment.

With reference to FIG. 28, there are shown example operations 2800 expanding on operation 2716 used to perform the service-level test and determine whether the service-level performance is degraded, when the at least one value is not within the confidence interval (i.e., represents a deviation outside of the confidence interval).

At 2802, the service-level test is performed. The service-level test may be indicative of user experience with the service, and thus may be thought of as a test or assessment of the user experience. In an example, the service-level test is associated with user traffic (e.g., data packets) conveyed by the service through service network 113 on behalf of a user of the service. Examples of user traffic that may be monitored may include actual user traffic, test user traffic that is injected into service network 113, and simulated user traffic used in a model of the service and/or service network 113.

At 2804, it is determined whether the service meets one or more service-level performance criteria with respect to the user traffic conveyed by the service. The service-level performance criteria may be defined in an SLA for the service, for example. Examples of service-level performance criteria include requirements that end-to-end data packet round-trip delay for the service is less than a round-trip delay threshold, data packet jitter experienced by data packets conveyed by the service is less than a data packet jitter threshold, a data packet drop rate experienced by data packets conveyed by the service is less than a data packet drop rate threshold, a packet error rate is less than a packet error rate threshold, and so on. Thus, operation 2804 may test end-to-end round-trip delay, data packet jitter, data packet drop rate, and so on, against their respective thresholds.

At 2806, if the user traffic conveyed by the service does not meet each of the one or more service-level performance criteria, the service is declared degraded, and thus the deviation of the at least one of the values outside of the confidence interval is deemed to be service-impacting. The deviation outside of the confidence interval accurately represents anomalous behavior at the service-level.

At 2808, if the user traffic conveyed by the service meets each of the one or more service-level performance criteria, the service is not declared degraded. The service is declared healthy. Thus, the deviation of the at least one of the values outside of the confidence interval is deemed not to be service-impacting. The deviation outside of the confidence interval does not accurately represent anomalous behavior at the service-level.

Figure 29:
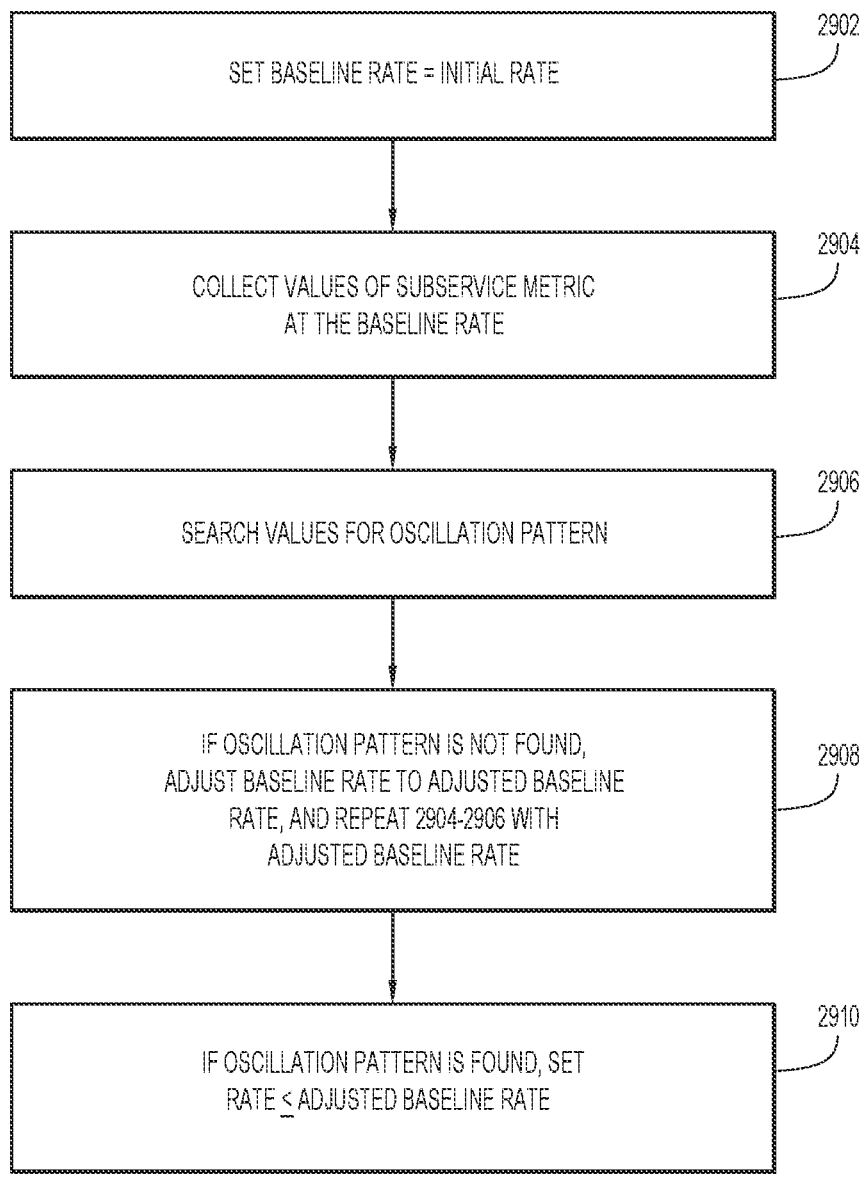
FIG. 29 shows operations expanding on an operation of the method of FIG. 27 used to determine an optimum rate for collecting/obtaining subservice metrics from a subservice, according to an example embodiment.

With reference to FIG. 29, there are shown example operations 2900 expanding on operation 2708 used to determine the (optimum) rate for collecting subservice metrics from the subservice.

At 2902, a baseline rate at which to obtain values (i.e., for collecting the values) of the subservice metric from the subservice is set to an initial rate that is relatively low, e.g., on the order of several Hz.

At 2904, values of the subservice metric are collected from the subservice at the baseline rate, to produce values for baselining the subservice. The values for baselining the subservice form a value amplitude vs. time waveform. Operation 2904 may configure the rate on the subservice, and collect the values at that rate, as described above in connection with operations 2202 and 2204 of method 2200.

At 2906, the values for baselining the subservice are searched for an (amplitude vs. time) oscillation pattern. The oscillation pattern may approximate a sine wave or a saw tooth waveform, for example. Any known or hereafter developed technique for detecting an oscillation pattern in samples of an amplitude vs. time waveform may be used at operation 2906 to detect the oscillation pattern. Another approach to finding the oscillation pattern may involve transforming the values to a frequency spectrum using a Fast Fourier Transform (FFT), and searching the frequency spectrum for a discernible peak amplitude representative of the presence of the oscillation pattern in the frequency domain, and the frequency corresponding to the amplitude peak represents the frequency of the oscillation pattern.

At 2908, if/when the oscillation pattern is not found, the baseline rate is adjusted, e.g. decreased, to an adjusted baseline rate, and operations 2904-2908 are repeated with the adjusted baseline rate, until the oscillation pattern is found.

At 2910, if/when the oscillation pattern is found, the rate is set equal to the adjusted baseline rate (or to a rate that is slightly less than the adjusted baseline rate) that resulted in detection of the oscillation pattern.

Figure 30:
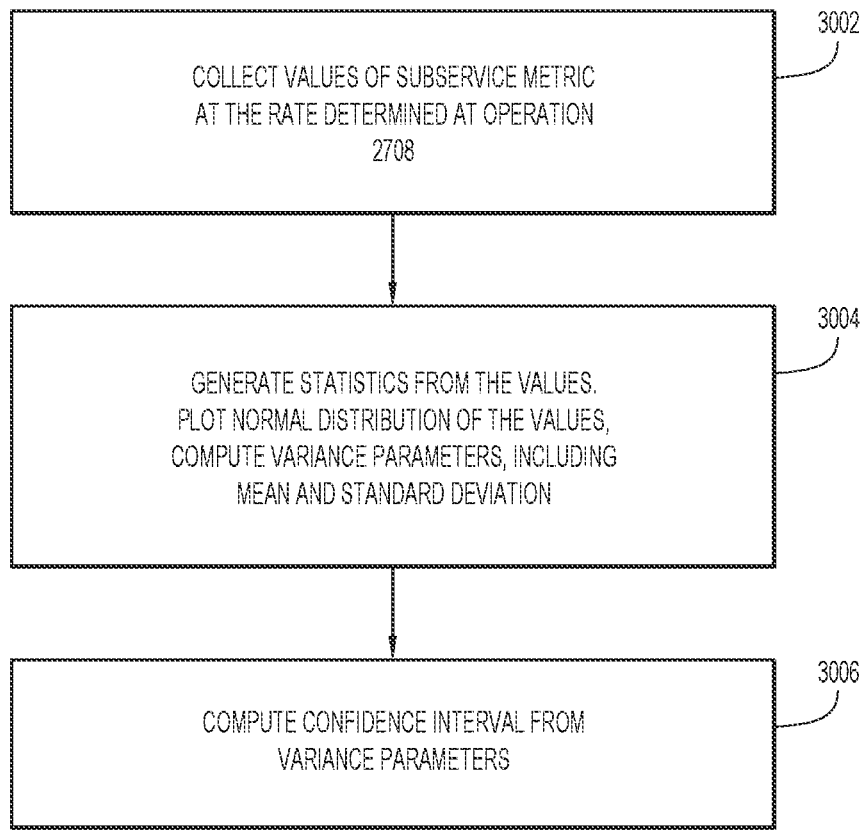
FIG. 30 shows operations expanding on an operation of the method of FIG. 27 used to determine a confidence interval for values of a subservice metric collected from a subservice, according to an example embodiment.

With reference to FIG. 30, there are shown example operations 3000 expanding on operation 2710 used to determine the confidence interval for the values of the subservice metrics from the subservice.

At 3002, values of the subservice metric are collected from the subservice to produce values for baselining the subservice (i.e., second values of the subservice metrics). The values may be collected at the (optimum) rate established previously at operation 2708. Operation 3002 may use features of operations 2202 and 2204 of method 2200.

At 3004, statistics are generated from the values collected at 3002. In one example, operations to generate statistics may include operations to:

a. Plot a normal distribution of the values. Other types of distributions may be plotted in other examples.
b. Compute variance parameters from the normal distribution. The variance parameters may include a mean and a standard deviation, for example.

At 3006, the confidence interval is computed based on the variance parameters. For example, the confidence interval may be set equal to +/−2 standard deviations from the mean.

Figure 31:
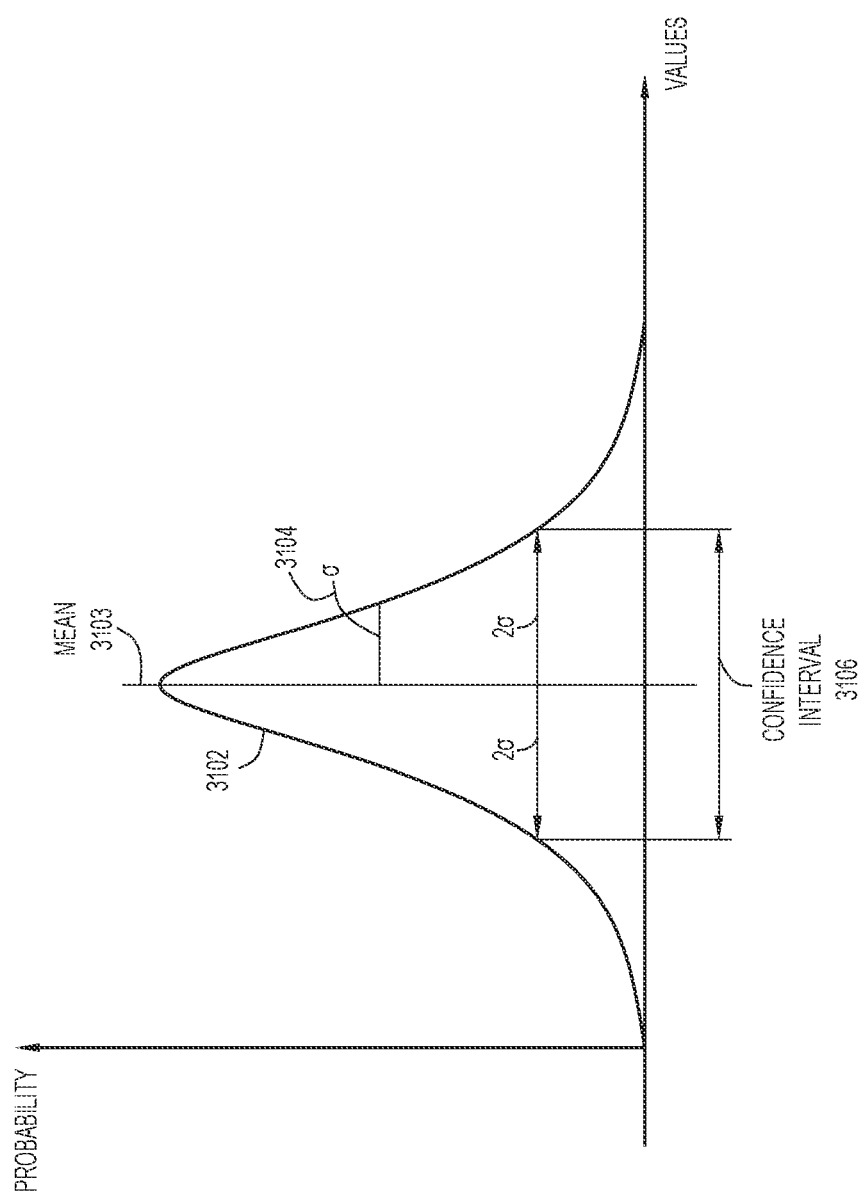
FIG. 31 is an illustration of statistics and a confidence interval that may be generated for values of a subservice metric by the method of FIG. 30, according to an example embodiment.

With reference to FIG. 31, there is an illustration of example statistics and a confidence interval that may be generated/computed by operations 3000. The example statistics include a normal distribution 3102 plotted at operation 3004 based on values collected at operation 3002. A mean 3103 and a standard deviation 3104 are computed from normal distribution 3102. A confidence interval 3106 is set equal to 2× the standard deviation. Other confidence intervals may derived or computed from normal distribution 3102.

Computer System for Assurance Entities

Figure 32:
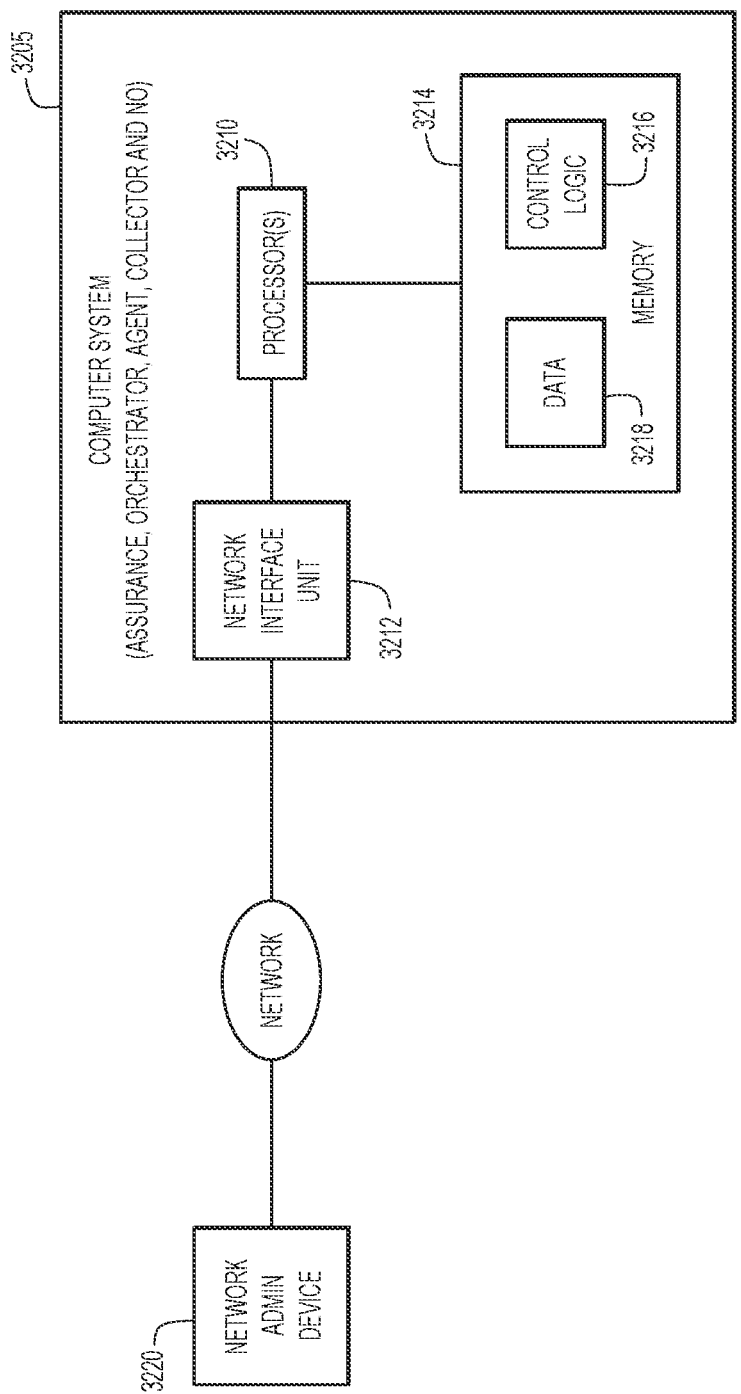
FIG. 32 is a hardware block diagram of an example computer system of a network orchestrator and an assurance entity, representative of one or more of an assurance orchestrator, assurance agents, and assurance collectors of the service assurance system, according to an example embodiment.

With reference to FIG. 32, there is shown a hardware block diagram of an example computer system 3205 of network orchestrator 102 and a service assurance entity, such as one or more of assurance orchestrator 106, assurance agents 108, and assurance collectors 110. Computer system 3205, such as a server, includes one or more processors 3210, a network interface unit (NIU) 3212 (or multiple such NIUs), and a memory 3214. Memory 3214 stores control software 3216 (referred as "control logic"), that when executed by the processor(s) 3210, causes the computer system to perform the various operations described herein for the service assurance entity and for network orchestrator 102.

The processor(s) 3210 may be a microprocessor or microcontroller (or multiple instances of such components). The NIU 3212 enables computer system 3205 to communicate over wired connections or wirelessly with a network. NIU 3212 may include, for example, an Ethernet card or other interface device having a connection port that enables computer system 3205 to communicate over the network via the connection port. In a wireless embodiment, NIU 3212 includes a wireless transceiver and an antenna to transmit and receive wireless communication signals to and from the network.

The memory 3214 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 3214 may comprise one or more tangible (non-transitory) computer readable storage media (e.g., memory device(s)) encoded with software or firmware that comprises computer executable instructions. For example, control software 3216 includes logic to implement operations performed by one or more (or all) of assurance orchestrator 106, assurance agents 108, assurance collectors 110, and network orchestrator 102. Thus, control software 3216 implements the various methods/operations described above. Control software 3216 also includes logic to implement/generate for display graphical user interfaces (GUIs) or, more generally, UIs, as necessary in connection with the above described methods/operations.

Memory 3214 also stores data 3218 generated and used by control software 3216, including network configuration information and service tags, service definitions, subservice dependency graphs, identifiers of shared and non-shared subservices and their associated statistics, heuristic packages, monitoring and telemetry objects, subservice metrics and service-tagged subservice metrics, health states and other KPIs, mappings between the aforementioned parameters stored in memory, optimum rates for collecting subservice metrics, statistics for values of subservice metrics, confidence intervals, and so on.

A user, such as a network administrator, may interact with computer system 3205, to receive reports, change algorithms, and so on, through GUIs by way of a user device 3220 (also referred to as a "network administration device") that connects by way of a network with computer system 3205. The user device 3220 may be a personal computer (laptop, desktop), tablet computer, SmartPhone, and the like, with user input and output devices, such as a display, keyboard, mouse, and so on. Alternatively, the functionality and a display associated with user device 3220 may be provided local to or integrated with computer system 3205.

In other embodiments, the assurance entity may be implemented as one or more virtual machines (VMs) and or containers.

Figure 33:
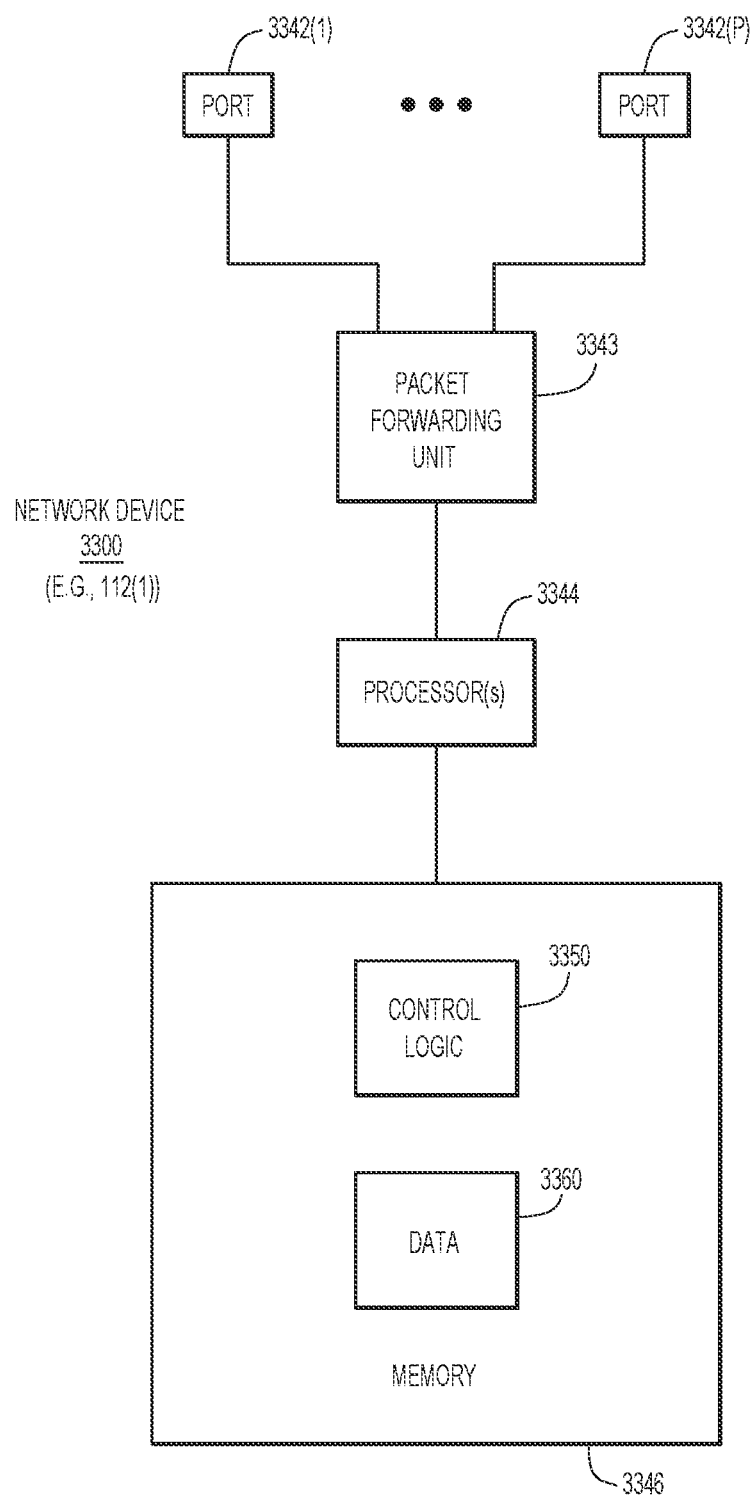
FIG. 33 is a block diagram of a network device on which a subservice may be implemented, according to an example embodiment.

With reference to FIG. 33, there is a block diagram of an example network device 3300, representative of each of network devices 112. Network device 3300 comprises a network interface unit having a plurality of network input/output (I/O) ports 3342(1)-3342(P) to send traffic to one or more networks and receive traffic from the networks, a packet forwarding/processing unit 3343, a network processor 3344 (also referred to simply as "processor"), a management port 3345 to exchange control messages with other network devices and an administration function, and a memory 3346. The packet forwarding/processing unit 3343 is, for example, one or more application specific integrated circuits (ASICs) that include packet buffers, packet queues, and other control logic for performing packet forwarding operations. The processor 3344 may include multiple processors, which may be implemented as software or hardware processors. For example, processor 3344 may include a microcontroller or microprocessor that is configured to perform higher level controls of network device 3300. To this end, the memory 3346 stores software instructions that, when executed by the processor 3344, cause the processor 3344 to perform a variety of operations including operations described herein. For example, the memory 3346 stores instructions for control logic 3350 to perform operations described herein for recording and reporting of subservice metrics, and for configuring network device 3300 responsive to network device configuration information 114. Control logic 3350 may also include logic components in packet forwarding unit 3343. Memory 3346 also stores data 3360 used and generated by logic 3350. Such data may include subservice metrics and device configuration information, for example, as described above.

In summary, embodiments presented herein, service assurance for intent-based networking (SAIN), for example, uses service tagging of subservice metrics recorded and reported by subservices of a service to help an assurance orchestrator/collector "find a needle in the haystack" with respect to identifying subservice problems that impact the service. This tagging helps the assurance orchestrator/collector assess all of the services that can be affected by particular telemetry data/sensor. The tagging facilitates specific export for data reduction, and filtering. The assurance orchestrator/collector can deterministically flag the services, including its subservices, which need user attention or can provide feedback for remediation. Example high-level operations include:

a. Get a service configuration from an assurance orchestrator. The service configuration includes a service type and a service instance.
    b. Create a specific service tag from the service configuration, e.g., <service type/service instance (e.g., identifier>tuple.
    c. Using the service configuration, an assurance platform, e.g., the assurance orchestrator, decomposes the service into a series of subservices for that specific service type/instance with rules of heuristic packages.
    d. Tag subservices metrics with the service tag.
    e. To monitor a specific customer service instance, request all tagged subservice metrics with the specific service tag.
    f. When determining service performance based on key performance indicators (KPIs), in case of service degradation/failure, identify the specific component(s)/subservices that has failed based on the service tag. Reconfigure the service (or network on which the service is enabled) to avoid the fault component.

Another embodiment is directed to applying baselining to service-tagged data/subservice metrics to determine what is normal in the service-tagged data, and to use that "normal" baseline to determine deviations. The deviations are further tested to determine whether they are customer/service-impacting. If so, the baseline is adjusted to more quickly and proactively spot customer/service-impacting deviations. If not, the data is recorded to provide troubleshooting and forensic data for investigating other customer-impacting issues.

In one form, a method is provided comprising: configuring a service as a collection of subservices on network devices of a network; decomposing a definition of the service into a subservice dependency graph that indicates the subservices and dependencies between the subservices that implement the service; based on the subservice dependency graph, configuring a subservice among the subservices to record and report a subservice metric as an indicator of subservice performance; determining a rate at which to obtain values of the subservice metric from the subservice; determining a confidence interval for the values of the subservice metric; obtaining the values of the subservice metric from the subservice at the rate, to produce values for monitoring the subservice; and determining whether at least one of the values for monitoring the subservice is within the confidence interval.

In another form, a system or apparatus is provided comprising: one or more network interface units; and one or more processors coupled to the one or more network interface units and configured to perform: configuring a service as a collection of subservices on network devices of a network; decomposing a definition of the service into a subservice dependency graph that indicates the subservices and dependencies between the subservices that implement the service; based on the subservice dependency graph, configuring a subservice among the subservices to record and report a subservice metric as an indicator of subservice performance; determining a rate at which to obtain values of the subservice metric from the subservice; determining a confidence interval for the values of the subservice metric; obtaining the values of the subservice metric from the subservice at the rate, to produce values for monitoring the subservice; and determining whether at least one of the values for monitoring the subservice is within the confidence interval.

In yet another form, non-transitory computer readable media are provided. The computer readable media store instructions that, when executed by one or more processors coupled to one or more network interface units, cause the one or more processors to perform configuring a service as a collection of subservices on network devices of a network; decomposing a definition of the service into a subservice dependency graph that indicates the subservices and dependencies between the subservices that implement the service; based on the subservice dependency graph, configuring a subservice among the subservices to record and report a subservice metric as an indicator of subservice performance; determining a rate at which to obtain values of the subservice metric from the subservice; determining a confidence interval for the values of the subservice metric; obtaining the values of the subservice metric from the subservice at the rate, to produce values for monitoring the subservice; and determining whether at least one of the values for monitoring the subservice is within the confidence interval.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
configuring a service as a collection of subservices on network devices of a network;
decomposing a definition of the service into a subservice dependency graph that indicates the subservices and dependencies between the subservices that implement the service;
based on the subservice dependency graph, configuring a subservice among the subservices, to produce a configured subservice to record and report a subservice metric as an indicator of subservice performance;
determining a rate at which to obtain values of the subservice metric from the configured subservice;
determining a confidence interval for the values of the subservice metric, such that a value of the subservice metric within or not within the confidence interval indicates normal subservice performance or degraded subservice performance, respectively;
obtaining the values of the subservice metric from the configured subservice at the rate, to produce values for monitoring the subservice; and
upon determining that at least one of the values for monitoring the configured subservice is not within the confidence interval and that service-level performance is not degraded, expanding the confidence interval to an expanded confidence interval that encompass the at least one of the values, such that subsequent values that are equal to the at least one of the values will be within the expanded confidence interval.

2. The method of claim 1, wherein the
expanding the confidence interval is performed to indicate that the at least one of the values for monitoring the configured subservice indicates the normal subservice performance, not the degraded subservice performance.

3. The method of claim 2, wherein the method further comprises:

while each of the values for monitoring the configured subservice is within the confidence interval, not determining whether the service-level performance is degraded.

4. The method of claim 2, wherein determining that the service-level performance is degraded includes:
determining that user traffic conveyed by the service in the network does not meet one or more service-level performance criteria.

5. The method of claim 4, wherein the one or more service-level performance criteria include data packet round-trip delay, data packet jitter, and data packet drop rate.

6. The method of claim 1, wherein the determining the rate includes:
setting a baseline rate to an initial rate at which to obtain values of the subservice metric from the configured subservice;
obtaining the values of the subservice metric from the configured subservice at the baseline rate, to produce values for baselining the configured subservice;
searching the values for baselining the configured subservice for an oscillation pattern;
if the oscillation pattern is not found, adjusting the baseline rate to an adjusted baseline rate, and repeating the obtaining the values of the subservice metric from the configured subservice at the baseline rate and the searching with the adjusted baseline rate; and
if the oscillation pattern is found, setting the rate equal to the adjusted baseline rate.

7. The method of claim 1, wherein the determining the confidence interval includes:
obtaining values of the subservice metric from the configured subservice, to produce values for baselining the configured subservice;
generating statistics from the values for baselining the configured subservice; and
computing the confidence interval based on the statistics.

8. The method of claim 7, wherein the generating the statistics includes:
plotting a normal distribution of the values for baselining the configured subservice; and
computing variance parameters from the normal distribution, the variance parameters including a mean and a standard deviation,
wherein the computing the confidence interval includes computing the confidence interval based on the variance parameters.

9. The method of claim 1, further comprising:
baselining the configured subservice, wherein the baselining includes:
obtaining values of the subservice metric from the configured subservice, to produce values for baselining the configured subservice; and
performing the determining the rate and the determining the confidence interval using the values for baselining the configured subservice; and
after the baselining, transitioning to monitoring the configured subservice, wherein the monitoring the configured subservice includes the obtaining the values for monitoring the configured subservice, and the determining whether the at least one of the values for monitoring the configured subservice is within the confidence interval.

10. The method of claim 1, wherein:
the configuring includes generating a monitoring object that defines the subservice metric that the configured subservice is to record and report, and providing the monitoring object to the configured subservice to configure the configured subservice to record and report the subservice metric; and
the obtaining the values of the subservice metric for monitoring the configured subservice is based on providing the monitoring object to the configured subservice.

11. The method of claim 10, wherein the generating the monitoring object includes:
generating a heuristic package that (i) specifies the subservice metric that the configured subservice is to record and report, and (ii) includes rules to compute a performance indicator for the configured subservice based on the subservice metric; and
generating the monitoring object based on the heuristic package.

12. The method of claim 1, wherein the configured subservice includes one or more of:
operations performed by network devices in the network;
communication behavior of interfaces of the network devices;
layer 1 (L1) network connectivity configured on the network devices, layer 2 (L2) network connectivity on the network devices, or layer 3 (L3) network connectivity on the network devices;
packet routing protocols on the network devices; and
logical network functions.

13. The method of claim 1, further comprising, for each of the subservices:
performing the configuring, the determining the rate, and the determining the confidence interval, to produce a respective rate and a respective confidence interval for each of the subservices; and
performing the obtaining the values of the subservice metric from the subservice at the respective rate, and the determining the at least one of the values for monitoring the subservice is within the respective confidence interval.

14. A system comprising:
one or more network interface units; and
one or more processors coupled to the one or more network interface units and configured to perform:
configuring a service as a collection of subservices on network devices of a network;
decomposing a definition of the service into a subservice dependency graph that indicates the subservices and dependencies between the subservices that implement the service;
based on the subservice dependency graph, configuring a subservice among the subservices, to produce a configured subservice to record and report a subservice metric as an indicator of subservice performance;
determining a rate at which to obtain values of the subservice metric from the configured subservice;
determining a confidence interval for the values of the subservice metric, such that a value of the subservice metric within or not within the confidence interval indicates normal subservice performance or degraded subservice performance, respectively;
obtaining the values of the subservice metric from the configured subservice at the rate, to produce values for monitoring the configured subservice; and
upon determining that at least one of the values for monitoring the configured subservice is not within the confidence interval and that service-level performance is not degraded, expanding the confidence interval to an expanded confidence interval that encompass the at least one of the values, such that subsequent values that are equal to the at least one of the values will be within the expanded confidence interval.

15. The system of claim 14, wherein the expanding the confidence interval is performed to indicate that the at least one of the values for monitoring the configured subservice indicates the normal subservice performance, not the degraded subservice performance.

16. The system of claim 15, wherein the one or more processors are further configured to:
while each of the values for monitoring the configured subservice is within the confidence interval, not determining whether the service-level performance is degraded.

17. Non-transitory computer readable media encoded with instructions that, when executed by one or more processors coupled to one or more network interface units, cause the one or more processors to perform:
configuring a service as a collection of subservices on network devices of a network;
decomposing a definition of the service into a subservice dependency graph that indicates the subservices and dependencies between the subservices that implement the service;
based on the subservice dependency graph, configuring a subservice among the subservices, to produce a configured subservice to record and report a subservice metric as an indicator of subservice performance;
determining a rate at which to obtain values of the subservice metric from the configured subservice by:
repeatedly varying a baseline rate at which values for determining the rate are obtained, while searching for an oscillation pattern in the values for determining the rate; and
when the oscillation pattern is found, setting the rate to the baseline rate;
determining a confidence interval for the values of the subservice metric;
obtaining the values of the subservice metric from the configured subservice at the rate, to produce values for monitoring the configured subservice; and
determining whether at least one of the values for monitoring the configured subservice is within the confidence interval.

18. The non-transitory computer readable media of claim 17, wherein the confidence interval is configured such that a value of the subservice metric within or not within the confidence interval indicates normal subservice performance or degraded subservice performance, respectively, and further comprising instructions to cause the one or more processors to perform:
if at least one of the values for monitoring the configured subservice is not within the confidence interval, determining whether service-level performance is degraded; and
if the service-level performance is not degraded, taking action to indicate that the at least one of the values for monitoring the configured subservice indicates the normal subservice performance, not the degraded subservice performance.

19. The non-transitory computer readable media of claim 18, further comprising instructions to cause the one or more processors to perform:
while each of the values for monitoring the configured subservice is within the confidence interval, not determining whether the service-level performance is degraded.

20. The non-transitory computer readable media of claim 17, wherein the oscillation pattern is one of a sine wave or a saw tooth waveform.

* * * * *